United States Patent
Erb et al.

(10) Patent No.: US 10,703,052 B2
(45) Date of Patent: Jul. 7, 2020

(54) ADDITIVE MANUFACTURING OF DISCONTINUOUS FIBER COMPOSITES USING MAGNETIC FIELDS

(71) Applicant: Northeastern University, Boston, MA (US)

(72) Inventors: Randall Erb, Newton, MA (US); Joshua J. Martin, Roxbury Crossing, MA (US)

(73) Assignee: Northeastern University, Boston, MA (US)

( * ) Notice: Subject to any disclaimer, the term of this patent is extended or adjusted under 35 U.S.C. 154(b) by 268 days.

(21) Appl. No.: 15/315,509

(22) PCT Filed: Jun. 8, 2015

(86) PCT No.: PCT/US2015/034625
§ 371 (c)(1),
(2) Date: Dec. 1, 2016

(87) PCT Pub. No.: WO2015/188175
PCT Pub. Date: Dec. 10, 2015

(65) Prior Publication Data
US 2017/0136699 A1    May 18, 2017

Related U.S. Application Data

(60) Provisional application No. 62/008,914, filed on Jun. 6, 2014.

(51) Int. Cl.
*B29C 67/00* (2017.01)
*B33Y 10/00* (2015.01)
(Continued)

(52) U.S. Cl.
CPC .......... *B29C 67/0081* (2013.01); *B22F 3/008* (2013.01); *B29C 64/124* (2017.08);
(Continued)

(58) Field of Classification Search
None
See application file for complete search history.

(56) References Cited

U.S. PATENT DOCUMENTS 4,575,330 A    3/1986 Hull
5,545,367 A    8/1996 Bae et al.
(Continued)

FOREIGN PATENT DOCUMENTS

CN    101778713 A1    7/2010
CN    102963002 A     3/2013
(Continued)

OTHER PUBLICATIONS

R. M. Erb, et al., "Composites Reinforced in Three Dimensions by Using Low Magnetic Fields", Science, Jan. 13, 2012, vol. 335, pp. 199-204.
(Continued)

*Primary Examiner* — Jeffrey D Washville
(74) *Attorney, Agent, or Firm* — Verrill Dana, LLP

(57) ABSTRACT

A method and apparatus for producing a composite part are provided to enable composite parts to be assembled with precise control over the orientation and spatial distribution of reinforcing or other particles within a matrix material. The method and apparatus use magnetic fields applied during various additive manufacturing processes to achieve complex particles orientations within each layer of the part. The composite parts can achieve enhanced properties, including mechanical, thermal, electrical and optical properties.

26 Claims, 25 Drawing Sheets

(51) Int. Cl.

| | | |
|---|---|---|
| *B29C 71/00* | (2006.01) | |
| *B33Y 80/00* | (2015.01) | |
| *B33Y 70/00* | (2020.01) | |
| *H01F 41/16* | (2006.01) | |
| *B33Y 30/00* | (2015.01) | |
| *B29C 64/124* | (2017.01) | |
| *B22F 3/00* | (2006.01) | |
| *B29C 70/62* | (2006.01) | |
| *B29C 64/165* | (2017.01) | |
| *B29C 64/386* | (2017.01) | |
| *B29K 105/16* | (2006.01) | |
| *B29K 505/12* | (2006.01) | |

(52) U.S. Cl.
CPC ............ *B29C 64/165* (2017.08); *B29C 70/62* (2013.01); *B29C 71/0072* (2013.01); *B33Y 10/00* (2014.12); *B33Y 30/00* (2014.12); *B33Y 70/00* (2014.12); *B33Y 80/00* (2014.12); *H01F 41/16* (2013.01); *B22F 2999/00* (2013.01); *B29C 64/386* (2017.08); *B29K 2105/162* (2013.01); *B29K 2505/12* (2013.01); *B29K 2995/0008* (2013.01)

(56) References Cited

U.S. PATENT DOCUMENTS

| | | | |
|---|---|---|---|
| 5,755,272 | A | 5/1998 | Mortensen et al. |
| 8,475,703 | B2 | 7/2013 | Turng et al. |
| 2005/0161119 | A1 | 7/2005 | McKinght et al. |
| 2007/0110977 | A1 | 5/2007 | Al-Haik et al. |
| 2010/0143668 | A1 | 6/2010 | Farmer et al. |
| 2011/0175259 | A1 | 7/2011 | Turng et al. |
| 2013/0053471 | A1* | 2/2013 | Studart ............... B29C 67/24 523/115 |
| 2013/0056672 | A1 | 3/2013 | Johnston et al. |
| 2013/0090405 | A1* | 4/2013 | Elimelech ............ C08K 7/00 522/71 |
| 2015/0024141 | A1* | 1/2015 | Shukla .................. C08F 2/50 427/510 |

FOREIGN PATENT DOCUMENTS

| | | |
|---|---|---|
| EP | 0403166 A2 | 12/1990 |
| EP | 2565022 A1 | 3/2013 |
| JP | 2013-525137 A | 6/2013 |
| WO | 2011/120643 A2 | 10/2011 |

OTHER PUBLICATIONS

L. S. Dimas, et al., "Tough Composites Inspired by Mineralized Natural Materials: Computation, 3D printing, and Testing", Advanced Functional Materials, (2013), vol. 23, pp. 4629-4638.

B. G. Compton, et al., "3D-Printing of Lightweight Cellular Composites", Advanced Materials, (2014), vol. 26, pp. 5930-5935.

U. G. K. Wegst, et al., "Bioinspired structural materials", Nature Materials, Jan. 2015, vol. 14, pp. 23-36.

T. E. Tay, et al., "Progressive Failure Analysis of Composites", Journal of Composite Materials, 2008, vol. 42, No. 18, pp. 1921-1966.

L. J. Bonderer, et al., "Bioinspired Design and Assembly of Platelet Reinforced Polymer Films", Science, Feb. 22, 2008, vol. 319, pp. 1069-1073.

A. P. Mouritz, et al., "Review of applications for advanced three-dimensional fibre textile composites", Composites: Part A: Applied Science and Manufacturing, (1999), vol. 30, pp. 1445-1461.

U. K. Vaidya, et al., "Processing of fibre reinforced thermoplastic composites", International Materials Reviews, (2008), vol. 53, No. 4, pp. 185-218.

Q. T. H. Shubhra, et al., "Mechanical properties of polypropylene composites: A review", Journal of Thermoplastic Composite Materials, (2011), vol. 26, No. 3, pp. 362-391.

Makamoto, T. et al., "Micro Part Reinforced by Addition of Unidirectional Short Fibers in Laser Photolithography by Applying Magnetic Field (Layered Thin Film with Aligned Short Fibers)", The Japan Society of Mechanical Engineers Collection of papers (Part C), Dec. 2010, vol. 76, No. 772, pp. 3843-3848.

Nakamoto, T. et al., "Layered Thin Film Micro Parts Reinforced with Aligned Short Fibers in Laser Stereolithography by Applying Magnetic Field", Journal of Advanced Mechanical Design, Systems, and Manufacturing, (2012), vol. 6, No. 6, pp. 849-858 (Translation of "Micro Part Reinforced by Addition of Unidirectional Short Fibers in Laser Photolithography by Applying Magnetic Field (Layered Thin Film with Aligned Short Fibers)").

* cited by examiner

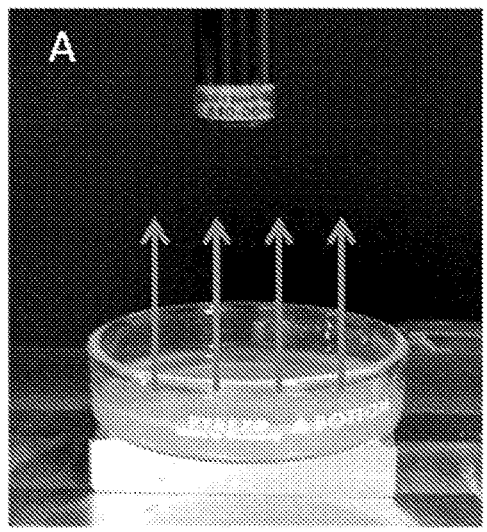 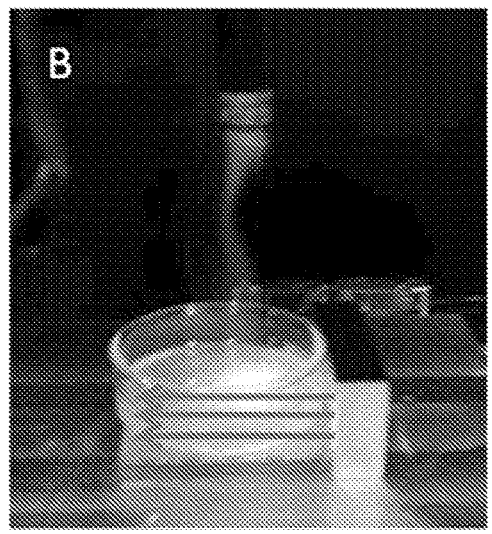
*FIG. 13A*  *FIG. 13B*
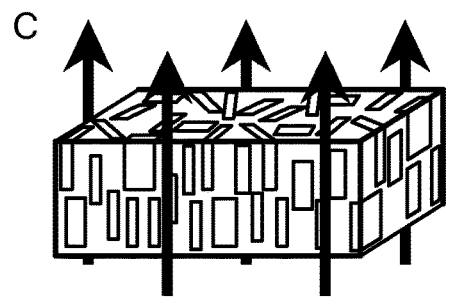 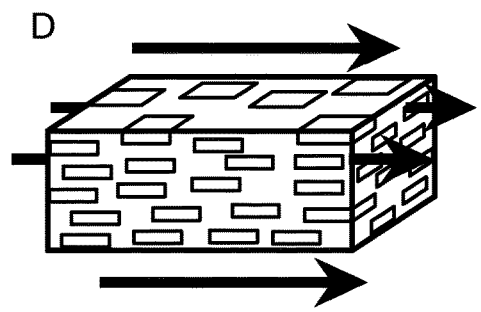
*FIG. 13C*  *FIG. 13D*
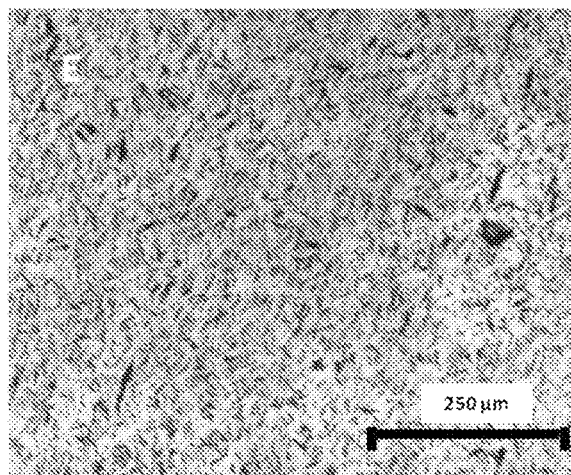 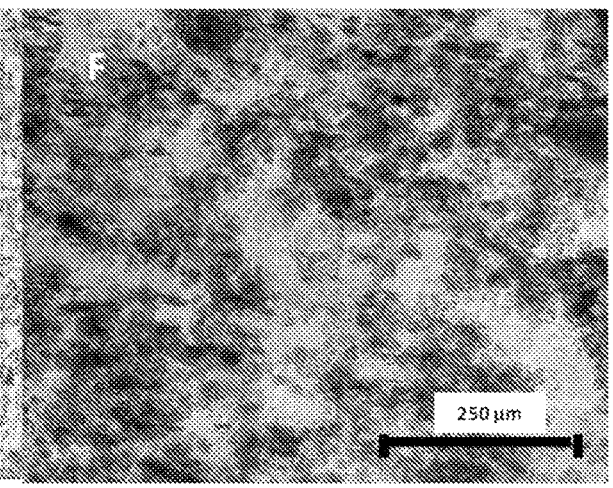
*FIG. 13E*  *FIG. 13F*

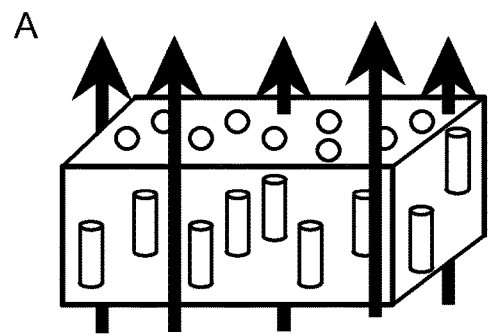
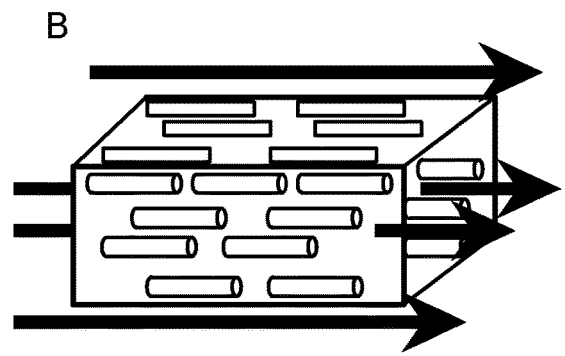
*FIG. 14A*  *FIG. 14B*
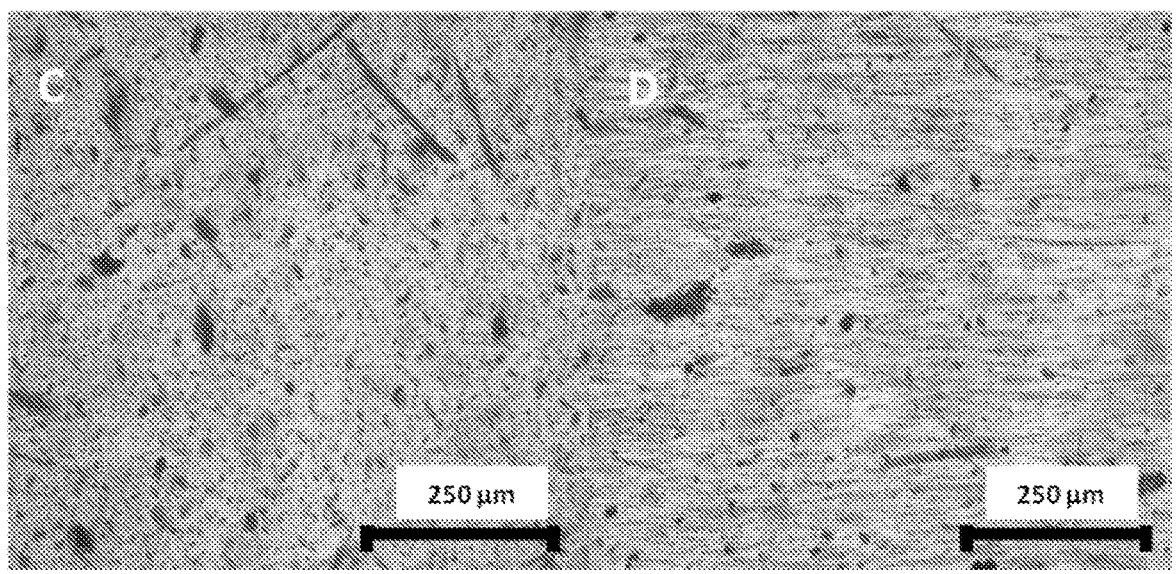
*FIG. 14C*  *FIG. 14D*

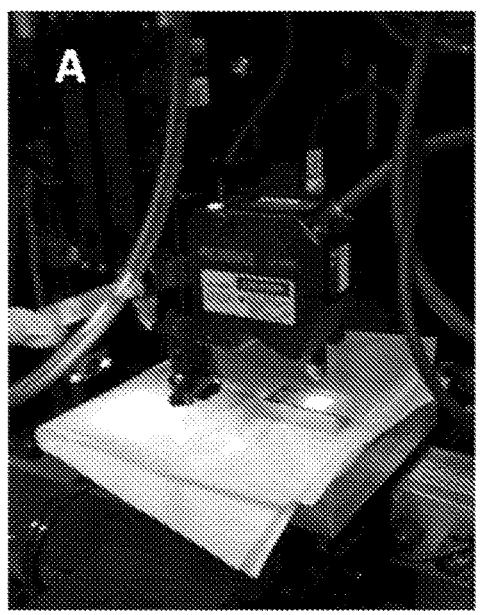 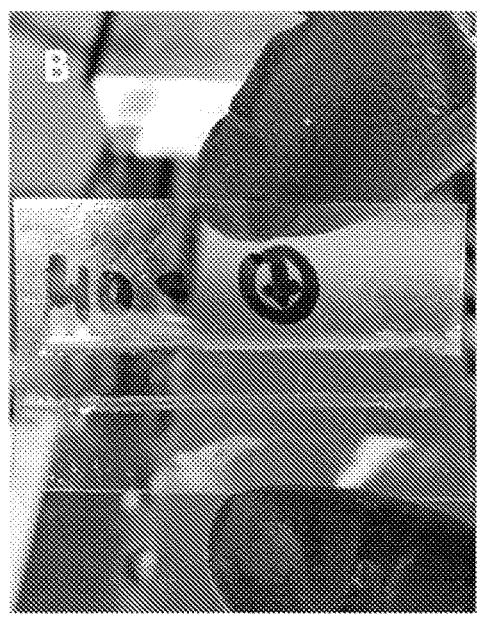
FIG. 15A  FIG. 15B
 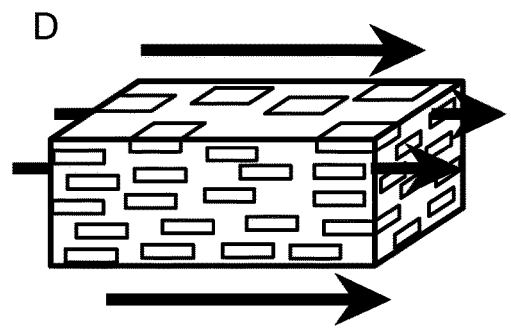
FIG. 15C  FIG. 15D
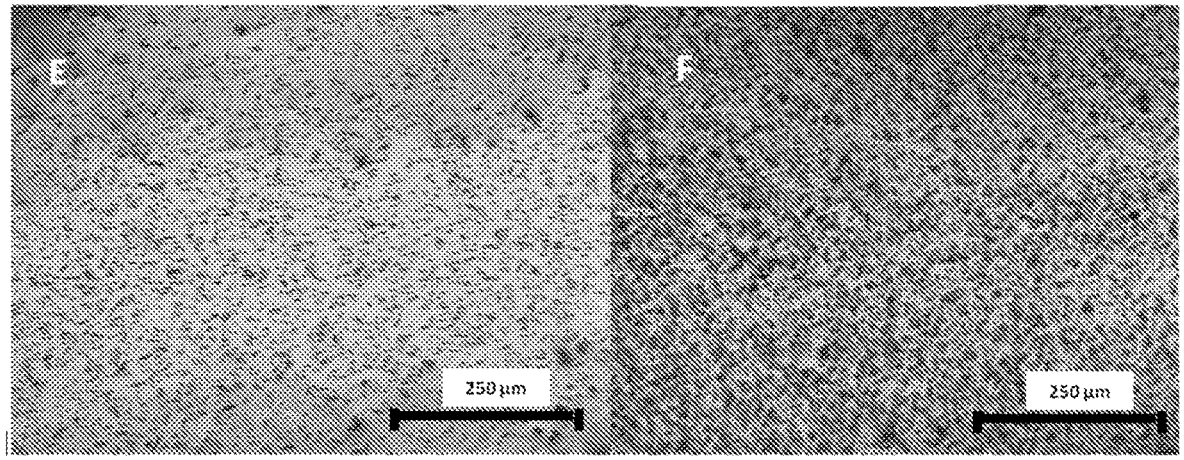
FIG. 15E  FIG. 15F

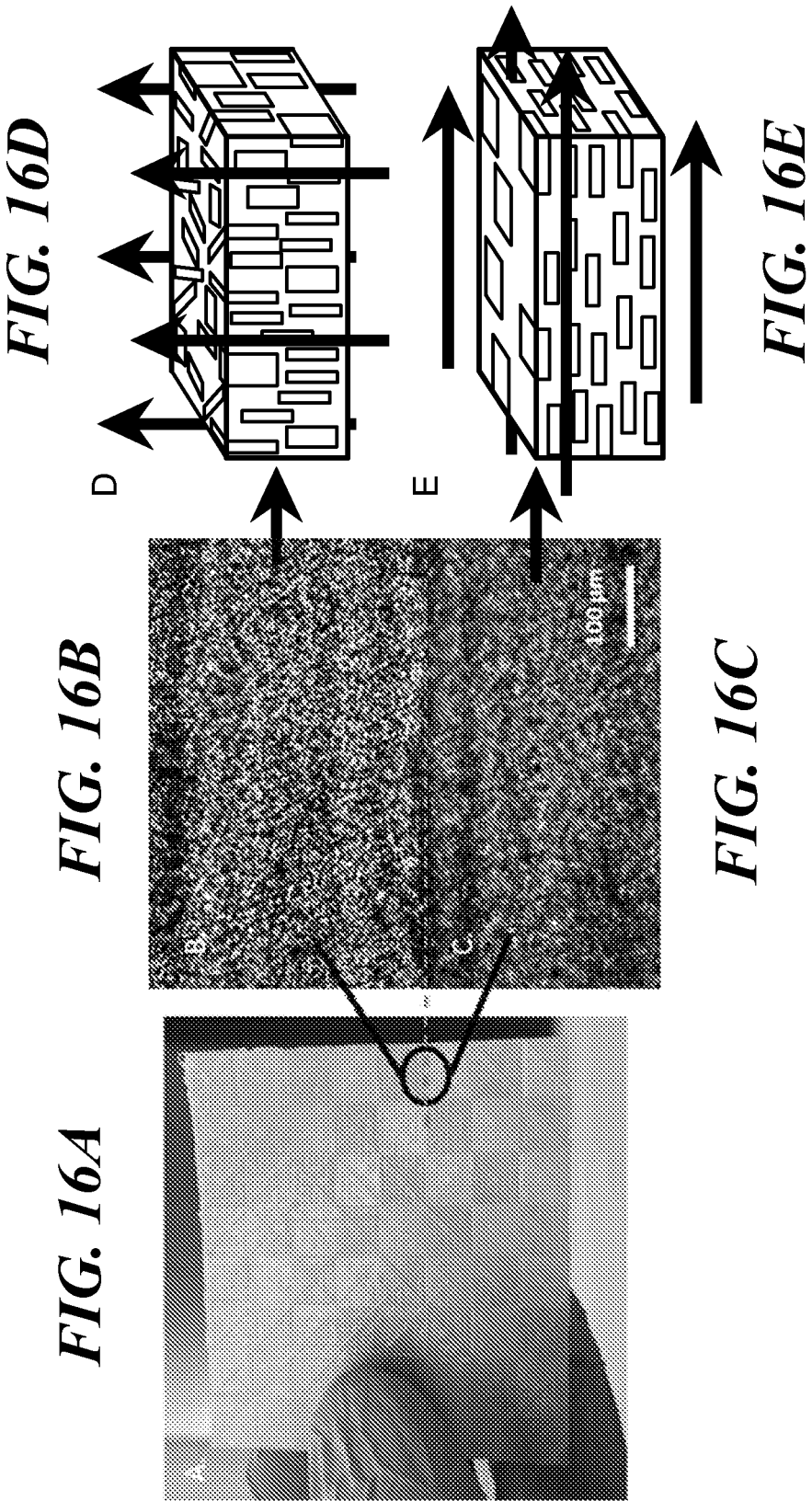

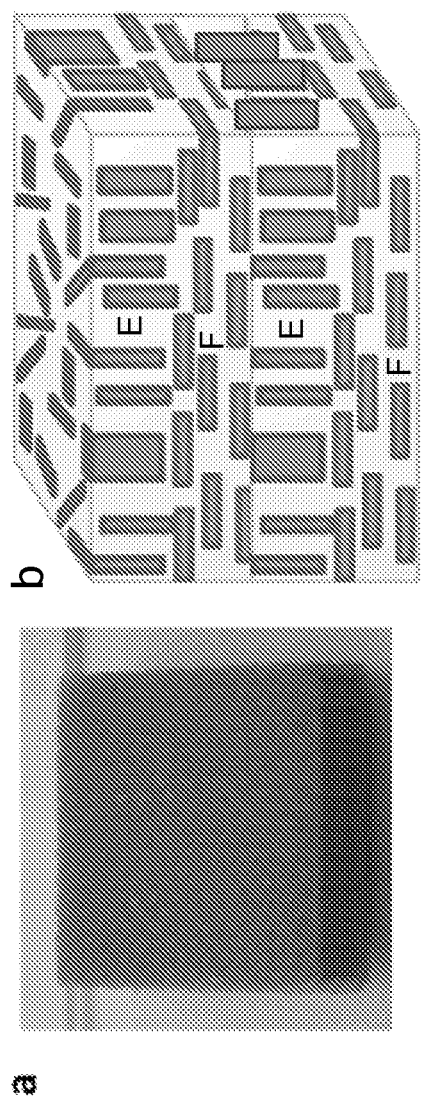
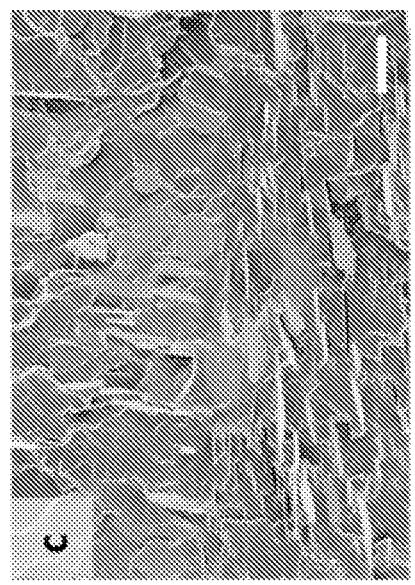
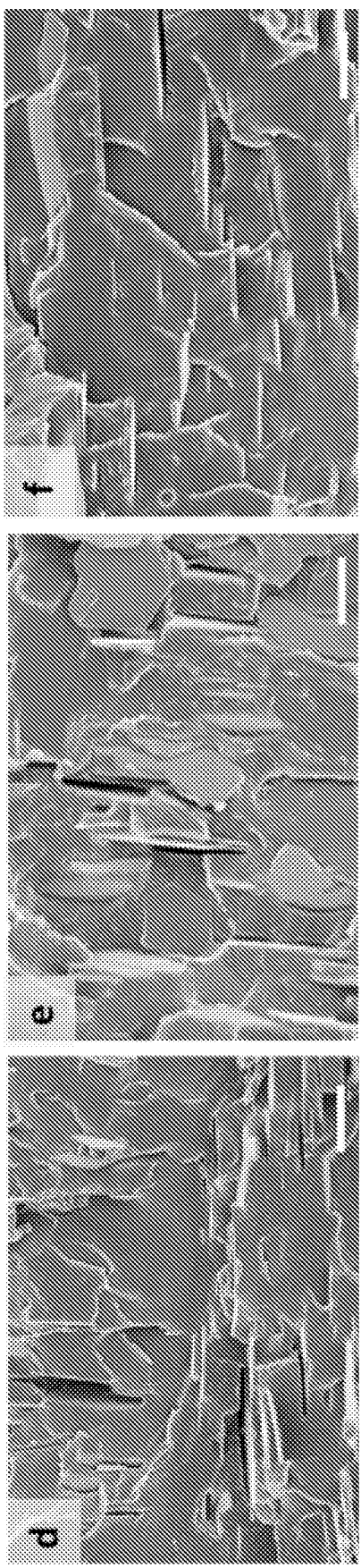
FIG. 17A  FIG. 17B  FIG. 17C
FIG. 17D  FIG. 17E  FIG. 17F

*FIG. 22A*     *FIG. 22B*
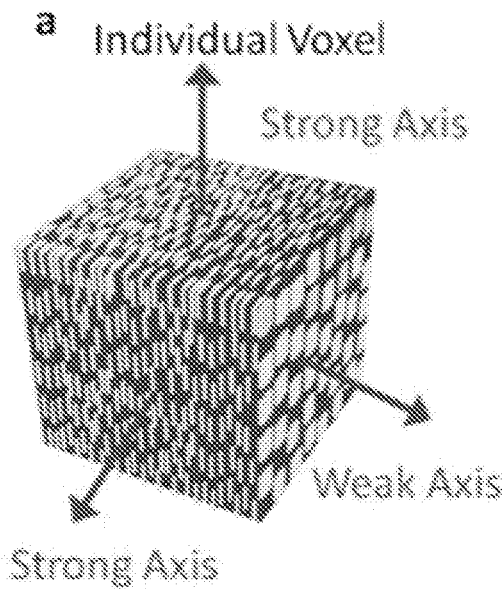
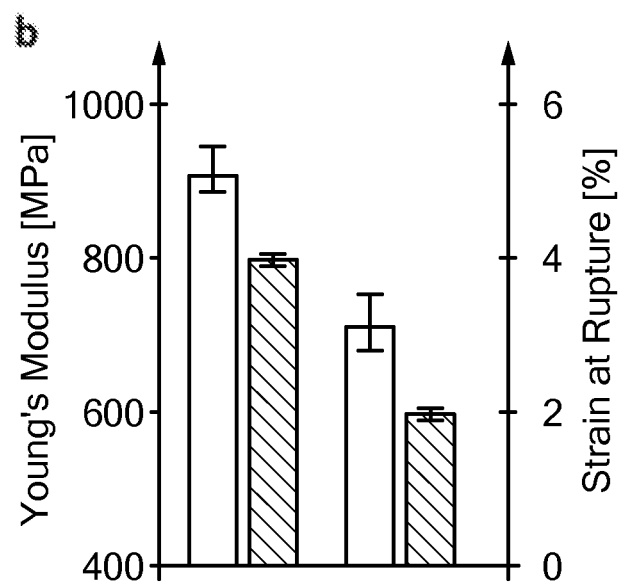
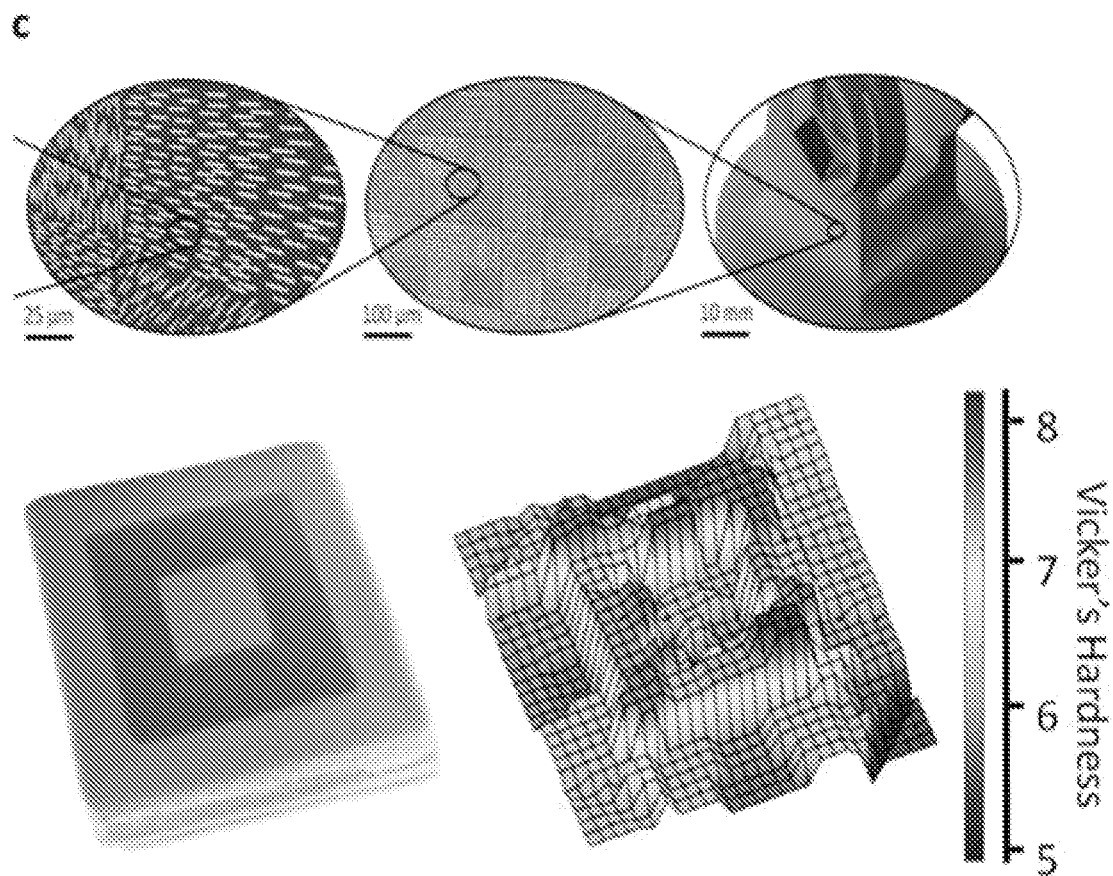
*FIG. 22C*

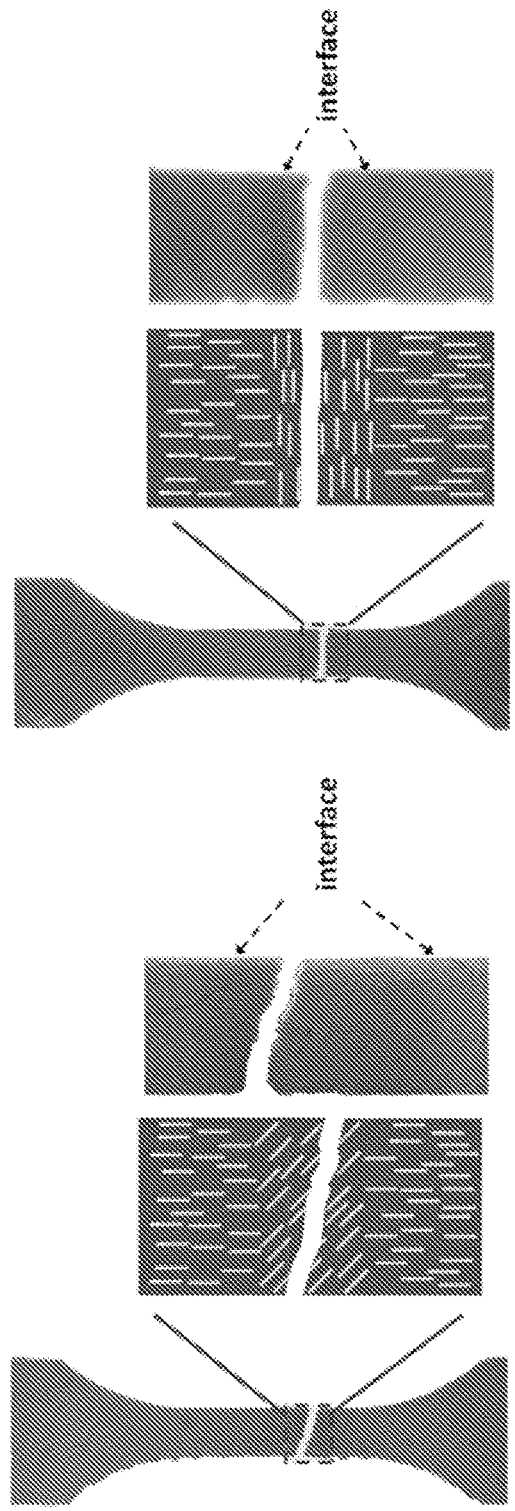
FIG. 25B
FIG. 25A
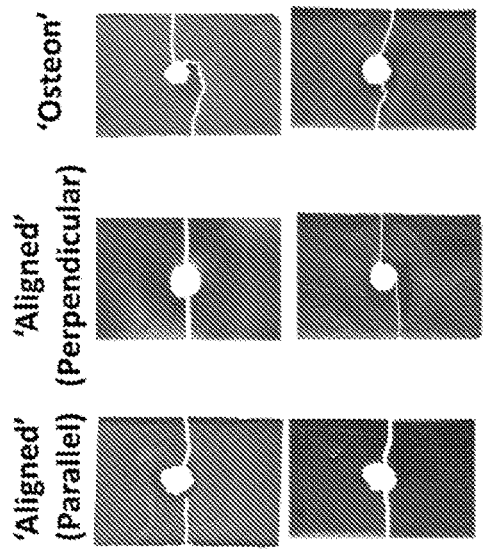
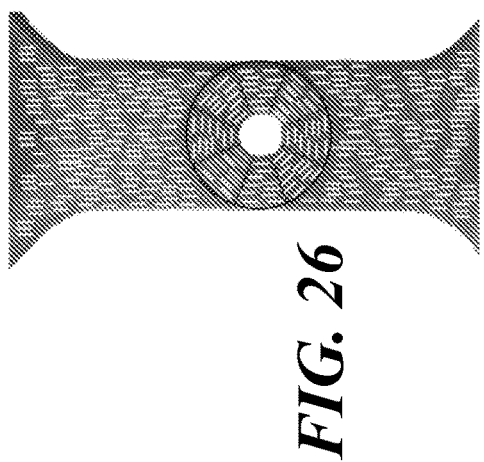
FIG. 26

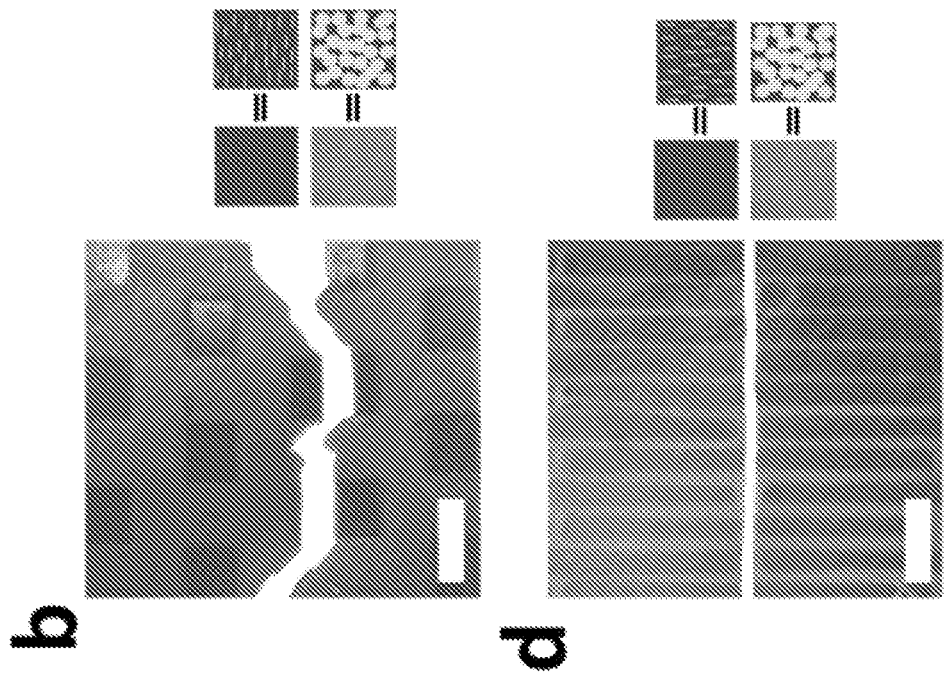
FIG. 28A FIG. 28B
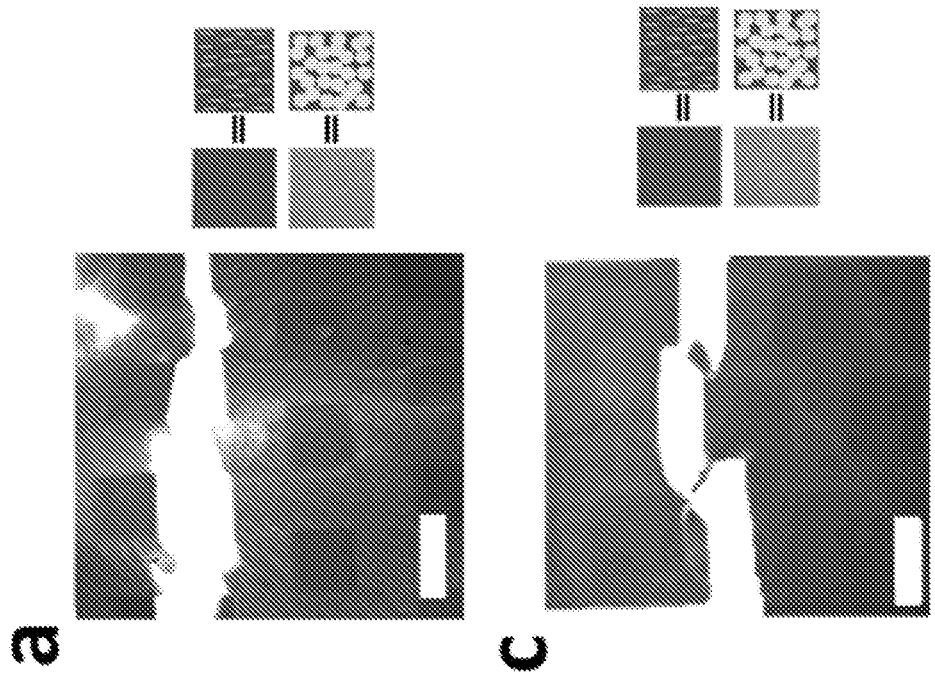
FIG. 28C FIG. 28D

ADDITIVE MANUFACTURING OF DISCONTINUOUS FIBER COMPOSITES USING MAGNETIC FIELDS

CROSS REFERENCE TO RELATED APPLICATIONS

This application claims priority under 35 § 119(e) of U.S. Provisional Application No. 62/008,914 filed on Jun. 6, 2014, entitled "Method for the Production of Discontinuous Fiber Architectures in Additive Manufacturing Processes With Magnetic Fields", the disclosure of which is hereby incorporated by reference.

STATEMENT REGARDING FEDERALLY SPONSORED RESEARCH OR DEVELOPMENT

N/A

BACKGROUND

Additive manufacturing (sometimes termed 3D printing) is used to fabricate complex three-dimensional structures out of a variety of materials, such as polymers, metals, and ceramics, at levels of resolution down to tens of microns. Load-bearing mechanical structures from gears to functional fuel nozzles for jet engines have been produced by these techniques.

The printing of polymers has been accomplished mainly by extrusion-based direct-write methods for thermoplastics and stereolithography (SLA) based photo-polymerization for both thermoplastics and thermosets. Printed polymers are lightweight but relatively weak. Thus, 3D printing is now moving toward manufacturing fiber-reinforced polymer composites. Industrial automated fiber placement (AFP) printers have been developed that can print continuous strand carbon fiber, Kevlar, and fiberglass reinforced polymer. These robotic placement printers are limited to reinforcement fibers with length scales greater than millimeters and geometries larger than centimeters with orientation control limited to the X-Y plane.

SUMMARY OF THE INVENTION

The invention provides an additive manufacturing technique that employs real time colloidal assembly to create highly programmable discontinuous reinforcement architectures, in which the orientation of the fibers can be precisely controlled.

One aspect of the invention is a method of producing a composite part, comprising:

(a) introducing a precursor material in a first layer adjacent a build plate, the precursor material comprising a matrix material and magnetically responsive particles, the magnetically responsive particles comprising at least in part a magnetic material;

(b) orienting the magnetically responsive particles in a first alignment with a first magnetic field;

(c) consolidating a first portion of the matrix material in the first layer with the magnetically responsive particles within the first portion held in the first alignment;

(d) orienting a further portion of the magnetically responsive particles in a further alignment different from the first alignment with a further magnetic field; and (e) consolidating a further portion of the matrix material in the first layer with the magnetically responsive particles within the further portion held in the further alignment.

In a further aspect of the method, steps (d) and (e) are repeated until a determined portion of the matrix material in the first layer has been consolidated.

In a further aspect of the method, in steps (c) and (e), the matrix material is partially cured, fully cured, solidified, polymerized, or cross-linked.

In a further aspect of the method, when a desired portion of the matrix material in the first layer has been consolidated, the first layer is removed from the build plate and additional precursor material is introduced adjacent the build plate in a second layer and adjacent to the first layer.

In a further aspect, the method further comprises:

(g) introducing additional precursor material in a second layer adjacent the first layer;

(h) orienting the particles in the second layer in a third alignment with a magnetic field;

(i) consolidating a first portion of the matrix material in the second layer with the magnetically responsive particles within the first portion held in the third alignment;

(j) orienting a further portion of the magnetically responsive particles in a fourth alignment with a magnetic field different from the third alignment;

(k) consolidating a second portion of the matrix material in the second layer to consolidate the matrix material with the magnetically responsive particles within the second portion held in the fourth alignment;

(l) repeating steps (j) and (k) until a desired portion of the matrix material in the second layer has been consolidated.

In a further aspect of the method, the first and further magnetic fields are applied by one or more magnetic field sources parallel to a plane of the first layer and one or more magnetic field sources out of plane with the first layer.

In a further aspect of the method, each of the first portion of the matrix material and the further portion of the matrix material comprise discrete voxels.

In a further aspect of the method, the voxels of the first portion are interspaced with the voxels of the further portion.

In a further aspect of the method, each voxel has a resolution of at least about 50×50×50 microns.

In a further aspect of the method, each layer has a thickness of at least about 50 microns.

In a further aspect of the method, the magnetic material comprises a ferromagnetic material, a paramagnetic material, a superparamagnetic material, iron oxide, iron, cobalt, nickel, an iron alloy, a cobalt alloy, or a nickel alloy.

In a further aspect of the method, the magnetic material comprises particles, microbeads, nanoparticles, filings, fibers, flakes, rods, whiskers, or platelets.

In a further aspect of the method, the magnetically responsive particles comprise a non-magnetic material coupled with the magnetic material.

In a further aspect of the method, the non-magnetic material comprises aluminum oxide, calcium phosphate, copper, glass, calcium sulfate, nylon, polystyrene, or silicon carbide.

In a further aspect of the method, the non-magnetic material comprises discontinuous fibers, rods, platelets, flakes, or whiskers.

In a further aspect of the method, the non-magnetic material is coated with the magnetic material.

In a further aspect of the method, the magnetically responsive particles are anisotropic in shape in at least one dimension.

In a further aspect of the method, the magnetically responsive particles have a longest dimension ranging from 200 nm to 1000 μm.

In a further aspect of the method, the magnetically responsive particles have a longest dimension ranging from 1 μm to 20 μm.

In a further aspect of the method, the magnetically responsive particles have an aspect ratio ranging from 2 to 200.

In a further aspect of the method, the matrix material comprises a photopolymer and in step (c) and step (e), the matrix material is cured by illumination of selected voxels of the matrix material with radiation having a wavelength selected to effect a curing of the photopolymer.

In a further aspect of the method, the radiation source ranges from 300 nm to 900 nm in wavelength.

In a further aspect of the method, the radiation source ranges from ultraviolet to infrared.

In a further aspect of the method, the matrix material comprises a photocurable acrylic material, a polymethylmethacrylate (PMMA) material, or a polyurethane material.

In a further aspect of the method, the matrix material of the precursor material has a viscosity prior to consolidation ranging from 0.7 mPa·s to 10 Pa·s.

In a further aspect of the method, the precursor material comprises an acrylic based photopolymer and reinforcing aluminum oxide micro-platelet particles labeled with iron oxide nanoparticles.

Another aspect of the invention is a composite part comprising magnetically responsive particles embedded in a matrix material, a plurality of the magnetically responsive particles within a single layer having different orientations in the matrix material, the part having at least one of a mechanical property, a thermal property, an electrical property, an electromagnetic property, and an optical property that is anisotropic.

In a further aspect of the composite part, the property comprises at least one of tensile strength, thermal conductivity, electrical conductivity, opacity, or color.

In a further aspect of the composite part, the part comprises a micro-aerial vehicle, catheter tubing, a biocompatible implant, a prosthetic device, an orthotic device, an aerospace component, an embedded electronic part, a helmet, headgear, a cast for a body part, mechanical hardware, or reinforcement around an opening.

A further aspect of the invention is a computer-readable medium storing instructions that, when executed by at least one processor unit of an additive manufacturing device, cause the additive manufacturing device to generate three-dimensional objects comprising a composite part, the composite part comprising: magnetically responsive particles embedded in a matrix material, a plurality of the magnetically responsive particles within a single layer having different orientations in the matrix material, the part having at least one of a mechanical property, a thermal property, an electrical property and an optical property that is anisotropic.

A still further aspect of the invention is an apparatus for producing a composite part, comprising:

a build plate in communication with a source of precursor material, the precursor material comprising a matrix material and magnetically responsive particles, the magnetically responsive particles comprising at least in part a magnetic material;

a radiation source disposed to apply radiation in discrete voxels to a layer of the precursor material disposed on the build plate;

a plurality of magnetic field sources disposed to apply a magnetic field in a plurality of orientations to the layer of the precursor material on the build plate; and a processor unit in controlling communication with the build plate, the radiation source, and the plurality of magnetic field sources.

In a further aspect of the apparatus, the plurality of magnetic field sources are disposed to apply a magnetic field having a component of field lines in a plane parallel to the build plate and a component of the field lines in a plane orthogonal to the build plate.

In a further aspect of the apparatus, the plurality of magnetic field sources includes at least two magnetic field sources disposed to apply a magnetic field in an orientation parallel to a plane of the build plate and at least one magnetic field sources disposed to apply a magnetic field in an orientation out-of-plane from the plane of the build plate.

In a further aspect of the apparatus, the plurality of magnetic field sources further includes at least two further magnetic field sources disposed to apply a magnetic field in the orientation parallel to the plane of the build plate.

In a further aspect of the apparatus, the at least two magnetic field sources in the orientation parallel to the plane of the build plate are disposed at a right angle to each other.

In a further aspect of the apparatus, at least a portion of the plurality of magnetic field sources are supported for movement about the plane of the build plate.

In a further aspect of the apparatus, at least a portion of the plurality of magnetic field sources are supported for movement about a plane parallel to the plane of the build plate.

In a further aspect of the apparatus, each of the magnetic field sources comprises a solenoid or an electromagnet.

In a further aspect of the apparatus, each of the magnetic field sources in a plane parallel to the plane of the build plate comprises a solenoid including a coil surrounding an iron core.

In a further aspect of the apparatus, at least one of the magnetic field sources in a plane orthogonal to a plane of the build plate comprises a solenoid including a coil surrounding an open core region.

In a further aspect of the apparatus, the radiation source is disposed to direct radiation through the open core region to the build plate.

In a further aspect of the apparatus, the radiation source ranges from 300 nm to 900 nm in wavelength.

In a further aspect of the apparatus, the radiation source ranges from ultraviolet to infrared.

In a further aspect of the apparatus, the radiation source is operative to direct radiation at selected ones of the discrete voxels.

In a further aspect of the apparatus, the radiation source comprises a digital light projector.

In a further aspect of the apparatus, the build plate is mounted for vertical movement with respect to the source of the precursor material.

In a further aspect of the apparatus, a reservoir comprises the source of the precursor material, and the build plate is mounted for vertical movement within and into the reservoir from above.

In a further aspect of the apparatus, a reservoir comprises the source of the precursor material, and at least a portion of the magnetic field sources are disposed circumferentially around the reservoir.

In a further aspect of the apparatus, a reservoir comprises the source of the precursor material, and at least one of the magnetic field sources is disposed vertically below the reservoir.

In a further aspect of the apparatus, the magnetic field source comprises a solenoid including a coil surrounding an open core region, and the radiation source is disposed below the solenoid to project radiation through the open core region to a layer of the precursor material in the reservoir adjacent to the build plate.

In a further aspect of the apparatus, the processor includes instructions to:

(a) introduce a precursor material from the source of precursor material in a first layer adjacent the build plate;

(b) actuate one or more of the plurality of magnetic field sources to apply a first magnetic field to the first layer to orient the magnetically responsive particles in a first alignment with the first magnetic field;

(c) actuate the radiation source to consolidate a first portion of the matrix material in the first layer with the magnetically responsive particles within the first portion held in the first alignment;

(d) actuate one or more of the plurality of magnetic field sources to apply a further magnetic field to orient a further portion of the magnetically responsive particles in a further alignment different from the first alignment with a further magnetic field; and (e) actuate the radiation source to consolidate a further portion of the matrix material in the first layer with the magnetically responsive particles within the further portion held in the further alignment.

DESCRIPTION OF THE DRAWINGS

The invention will be more fully understood from the following detailed description taken in conjunction with the accompanying drawings in which:

FIG. 13A is a photograph of an experimental setup for providing vertical alignment of magnetically responsive platelets using a stereolithography type method;

FIG. 13B is a photograph of an experimental setup for providing horizontal alignment of magnetically responsive platelets using a stereolithography type method;

FIG. 13C is a schematic diagram indicating vertical, out-of-plane alignment of the platelets of FIG. 13A;

FIG. 13D is a schematic diagram indicating horizontal, in-plane alignment of the platelets of FIG. 13B;

FIG. 13E is a photomicrograph of a sample from the experimental setup of FIG. 13A;

FIG. 13F is a photomicrograph of a sample from the experimental setup of FIG. 13B;

FIG. 14A is a schematic diagram indicating vertical, out-of-plane alignment of magnetically responsive rods from an experimental setup similar to FIG. 13A;

FIG. 14B is a schematic diagram indicating horizontal, in-plane alignment of magnetically responsive rods from an experimental setup similar to FIG. 13B;

FIG. 14C is a photomicrograph of a sample from the experiment of FIG. 14A;

FIG. 14D is a photomicrograph of a sample from the experiment of FIG. 14B;

FIG. 15A is a photograph of an experimental setup for providing vertical alignment of magnetically responsive platelets using a micro-nozzle printing method;

FIG. 15B is a photograph of a sample from the experimental setup of FIG. 15A;

FIG. 15C is a schematic diagram indicating vertical, out-of-plane alignment of the platelets of FIG. 15A;

FIG. 15D is a schematic diagram indicating horizontal, in-plane alignment of the platelets;

FIG. 15E is a photomicrograph of a sample from the experimental setup of FIG. 15C;

FIG. 15F is a photomicrograph of a sample from the experimental setup of FIG. 15D;

FIG. 16A is a photograph of a chess board demonstrating two discrete alumina platelet orientations formed according to an embodiment of the present method;

FIGS. 16B and C is a photomicrograph (at 10× magnification) of the chess board at an interface between an out-of-plane alignment (B) and an in-plane alignment (C);

FIG. 16D is a schematic illustration depicting the out-of-plane alignment of FIG. 16B;

FIG. 16E is a schematic illustration depicting the in-plane alignment of FIG. 16C;

FIG. 17A is a photograph of a three-dimensional block with 10% vol. magnetically responsive platelets formed according to an embodiment of the present method;

FIG. 17 B is a schematic illustration depicting the orientation of the platelets of the block of FIG. 17A;

FIG. 17C is a scanning electron microscopy image of the block of FIG. 17A at an interface;

FIG. 17D is a scanning electron microscopy image of the block of FIG. 17A at an interface;

FIG. 17E is a scanning electron microscopy image of the block of FIG. 17A of one orientation;

FIG. 17F is a scanning electron microscopy image of the block of FIG. 17A of one orientation;

FIG. 22A is a schematic illustration of an individual voxel;

FIG. 22B is a graph of Young's modulus and strain at rupture of monolithic composites formed by an embodiment of the present method;

FIG. 22C is a two-dimensional hardness mapping of the surface of a three-dimensional architecture formed by an embodiment of the present method;

FIGS. 25A and B illustrate failure modes from tensile tests conducted on dogbone specimens with different particle orientations;

FIG. 26 illustrates failure modes from tensile tests conducted on dogbone specimens having a concentrically reinforced hole in the center;

FIG. 28A-D illustrate the capability to manipulate fracture with various particle orientations.

DETAILED DESCRIPTION OF THE INVENTION

Figure 1:
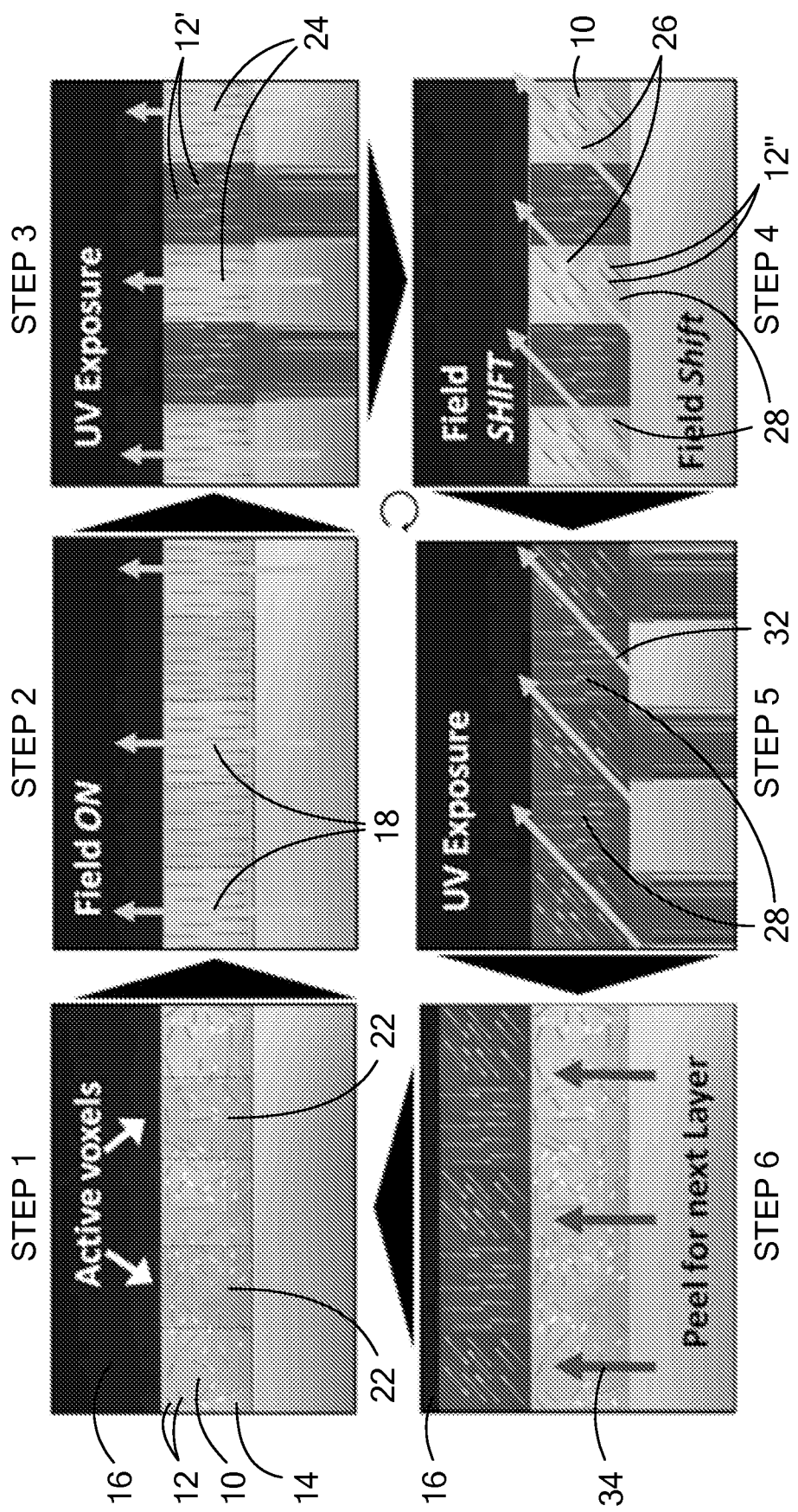
FIG. 1 is a schematic flow diagram of one embodiment of an additive manufacturing method.
Figure 2:
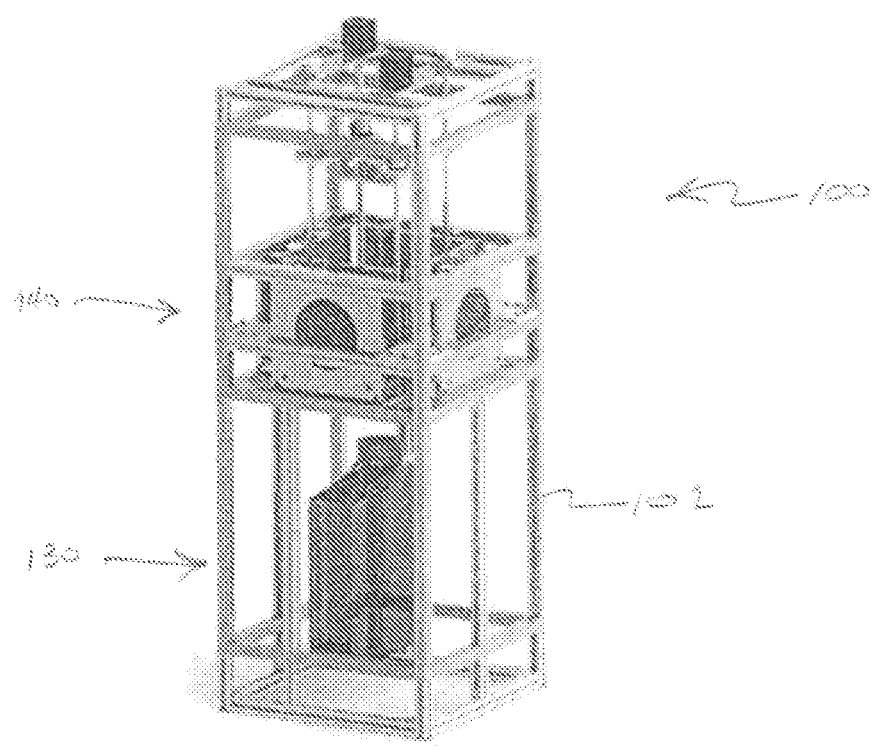
FIG. 2 is an isometric view of one embodiment of an apparatus for additive manufacturing.
Figure 3:
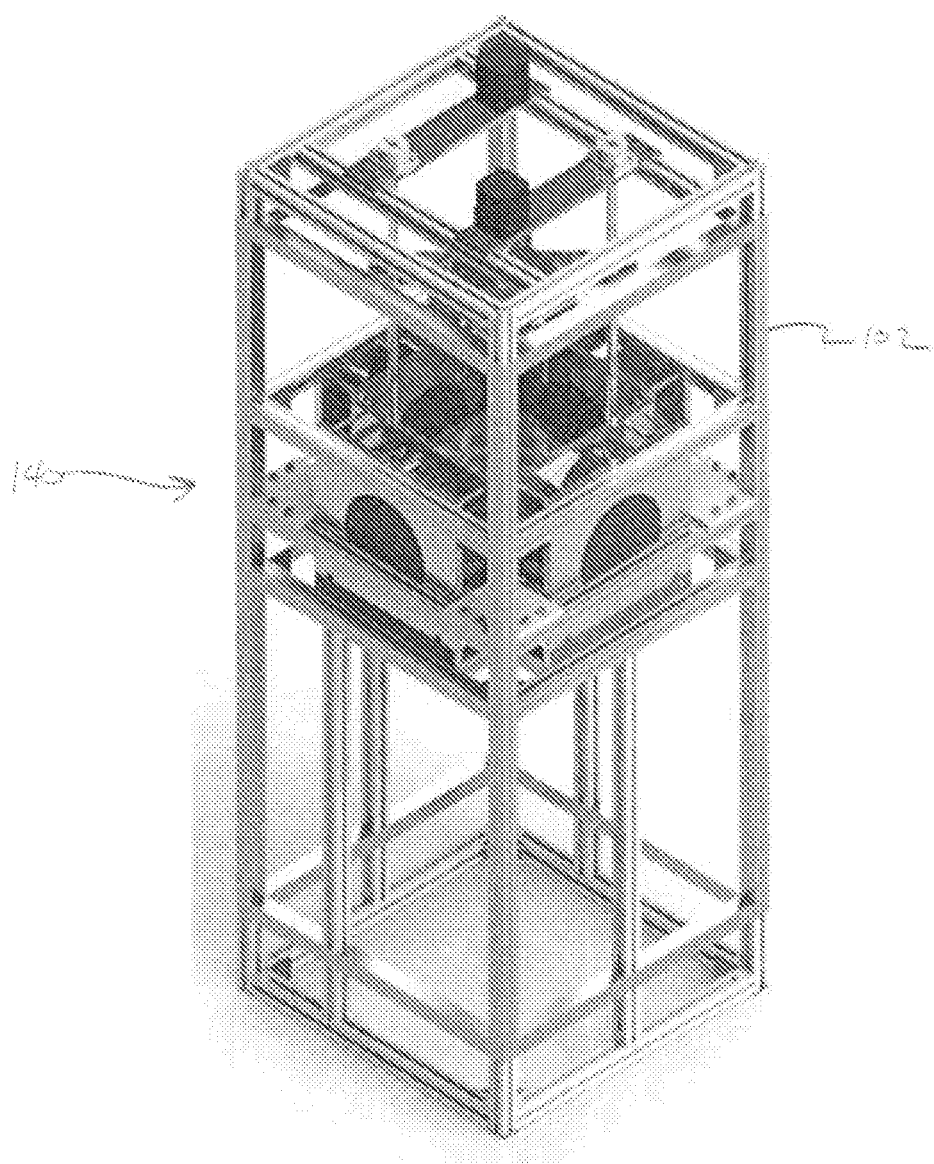
FIG. 3 is an isometric view of the apparatus of FIG. 2 with the radiation source removed for clarity.
Figure 4:
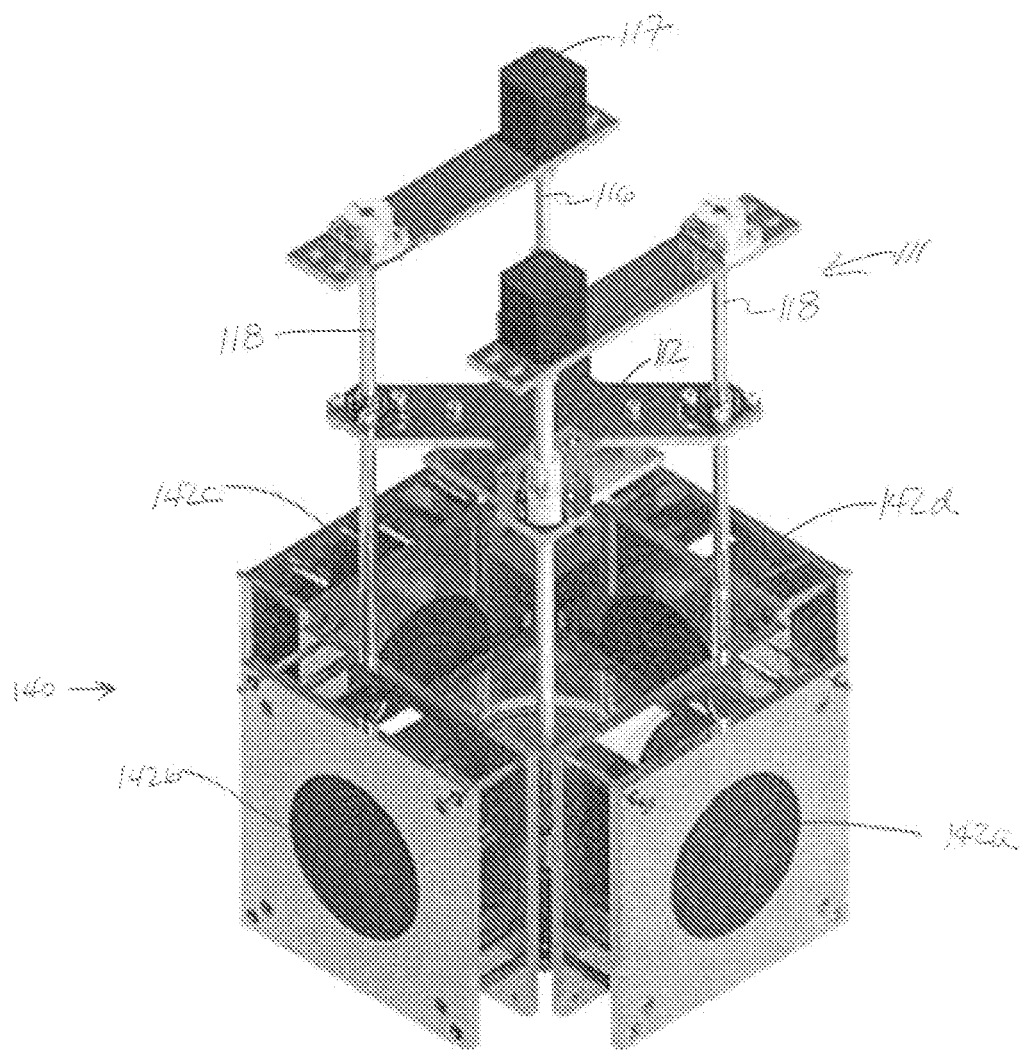
FIG. 4 is an isometric view of the magnetic field system and linear movement system of FIG. 2.
Figure 5:
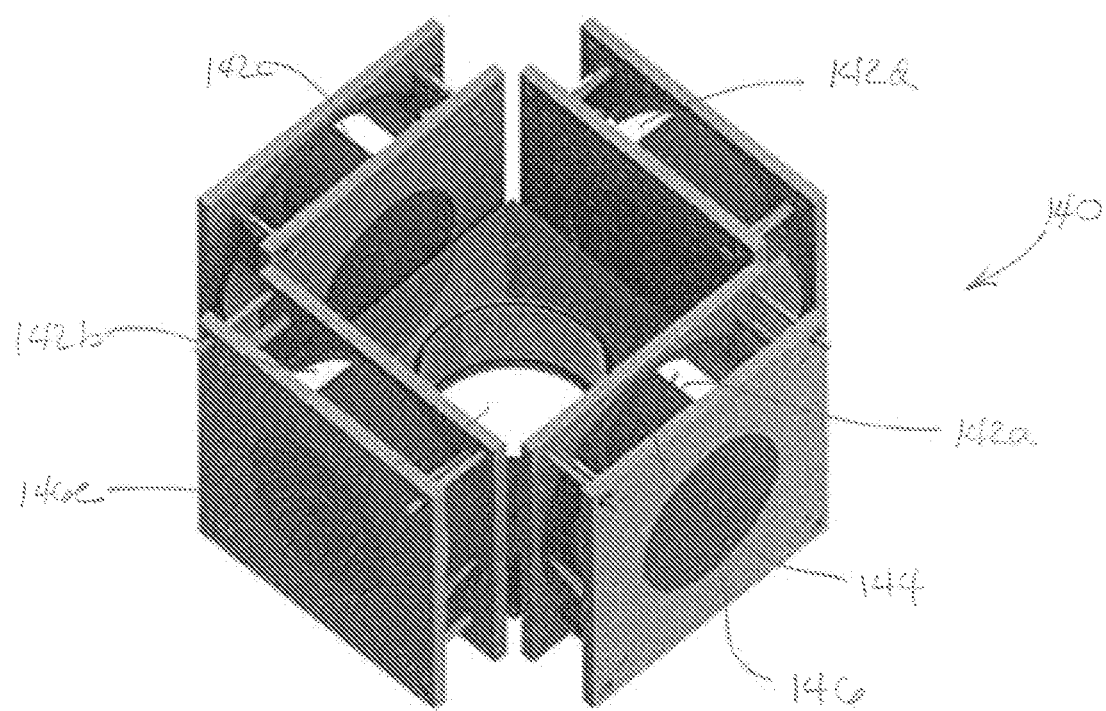
FIG. 5 is an isometric view of the magnetic field system of FIG. 2.

This application incorporates by reference the entire disclosure of U.S. Provisional Application No. 62/008,914 filed on Jun. 6, 2014, entitled "Method for the Production of Discontinuous Fiber Architectures in Additive Manufacturing Processes With Magnetic Fields."

Discontinuous fiber composites represent a class of materials that are strong, lightweight and have remarkable fracture toughness. A challenge to adapting additive manufacturing technology to discontinuous fiber-reinforced composites is the ability to control the orientation of fibers during the printing process. A fiber aligned with the applied stress reinforces the encompassing matrix, while an orthogonal fiber acts as a defect, weakening the polymer matrix. Randomized fibers (standard for systems without control) perform in the region between these two extremes resulting in negligibly impacting composite strength while severely sacrificing ductility.

A method and apparatus for producing a composite part, such as a reinforced composite part, are provided that enable control over the fiber or other particle orientation within each layer of the part during manufacture by combining magnetic assembly and additive manufacturing to fabricate composite materials with complex microstructural particle orientation. The method and apparatus employ directed colloidal assembly during a layer-by-layer manufacturing process to provide complete and programmable control over the orientation of reinforcing or other particles within a composite material. As an example, with this method and apparatus, reinforcement architectures can be produced that enable composite materials to exhibit enhanced mechanical properties, such as, without limitation, greater stiffness, increased strength, hard and soft phases on the order of microns, and higher fracture energy properties, as well as multi-functional performance. In addition to enhanced mechanical properties, composite parts with other enhanced properties, such as thermal, electrical, and optical properties, can be produced. The method is robust, low cost, scalable, sustainable, and can enable a new class of strong, lightweight composite parts with programmable properties.

Employing the method and apparatus described herein, a composite part is formed from a precursor material that includes magnetically responsive particles dispersed within a matrix material in a precursor liquid form. At least a portion of each of the magnetically responsive particles includes a magnetic material. For example, the particles can be formed from a non-magnetic material labeled with magnetic particles or can be formed entirely from a magnetic material. The magnetically responsive particles can have any desired shape or configuration to impart the intended properties to the finished composite part. Examples include, without limitation, discontinuous fibers, rods, platelets, flakes, whiskers, and platelets.

The matrix material is capable of being consolidated, for example by polymerization upon exposure to ultraviolet radiation. Consolidation of the matrix material is sufficient to maintain the magnetically responsive particles in a desired orientation in the consolidated portion of the matrix material in the presence of a later-applied magnetic field having a different orientation during the process or by the apparatus. Consolidation can include, without limitation, solidification, partial curing, full curing, polymerization, and cross-linking.

The precursor material is introduced into an additive manufacturing apparatus. The additive manufacturing apparatus can include a processor unit that includes instructions and a data file for producing a composite part layer by layer. The data file can be a computer aided design file (for example, .stl) that specifies the architecture of the part to be produced. The data file includes the desired orientation of the magnetically responsive particles within each layer of the part. Within each layer, particles can have differing orientations. The data file includes data defining each portion of each layer having a comparable particle orientation. For example, each layer is defined by an array of voxels (volume pixels), and each portion is defined by a subset of voxels from the array of voxels. Each portion can be a single continuous region, or can be a plurality of discrete regions. Voxel resolution can be at least about 50×50×50 microns.

In one embodiment, referring to FIG. 1, the precursor material 10 having magnetically responsive particles 12 in a matrix material 20 is introduced into the additive manufacturing apparatus, for example, in a first layer 14 adjacent to a build plate 16, in step 1. A first magnetic field 18 is applied to the precursor material to orient the magnetically responsive particles 12 in a first alignment, in step 2. The duration of application of the magnetic field can depend on factors such as the strength of the applied magnetic field, the rotational frequency of the applied field, the viscosity of the precursor material, the amount of magnetic material included in the magnetically responsive particles, and the geometry of the magnetically responsive particles. In some embodiment, the duration can range from 1 second to 5 minutes. In some embodiments, the strength of the magnetic field can range from 50 Oersted to 1000 Oersted. A first portion 22, the active voxels, of the matrix material within the first layer 14 is then consolidated, while maintaining the magnetic field on, such that the orientation of the magnetically responsive particles 12' within this first portion becomes fixed, in step 3. Consolidation can be achieved by, for example, polymerizing the active voxels in the matrix material with radiation of an appropriate wavelength, such as ultraviolet radiation 24. The duration of the consolidation step can depend on factors such as the particular matrix material selected and whether the material is to be partially cured or fully cured. In some embodiments, the duration can range from 2 seconds to 20 seconds.

A second magnetic field 26 is then applied to the precursor material 10 in the first layer 14 to orient the remaining, still movable, particles 12" in a second alignment, in step 4. The reinforcing particles 12' in the first portion do not move out of alignment upon application of the second magnetic field, because they are fixed in position by consolidation of the matrix material in which they are embedded. The matrix material in a second portion 28 in the first layer 14, which now forms the active voxels, is then consolidated, thereby fixing the orientation of the particles in the second portion, in step 5. These steps of applying a magnetic field to orient any remaining reinforcing particles, for example, with UV radiation 32, following by consolidation of the active voxels of the matrix material in the selected portion can be repeated any suitable number of times to achieve any desired orientation of the particles within the layer. Once the selected portions of the first layer 14 have been entirely consolidated, the first layer is shifted vertically, for example, in a peel process, so that additional precursor material 34 can flow into place adjacent the build plate 16, between the build plate and the first layer 14, in step 6. (It will be appreciated that the entire layer may not be consolidated, depending on the geometry of the part to be produced.)

The steps of applying a magnetic field to orient the magnetically responsive particles following by consolidation of the matrix material in a selected portion are then repeated any suitable number of times to achieve any desired orientation of the magnetically responsive particles within the second layer. Once the selected portions of the second layer have been completely consolidated, a third layer and any subsequent layers can be built up in the same manner by repeating these steps. In this manner, a composite part can be built up layer by layer with any desired complex orientation of the particles and geometry.

One embodiment of an apparatus 100 for producing a composite part according to the process is illustrated in FIGS. 2-9. The apparatus includes a build plate 110 or print stage movable into communication with a source 120 of the precursor material. A radiation source 130 is disposed to apply radiation in discrete voxels to a layer of the precursor material adjacent the build plate. A magnetic field system 140 having one or more magnetic field sources 142 is provided that is capable of applying a magnetic field in a plurality of orientations to the layer of the precursor material on the build plate.

A processor unit 160, including memory 162, can be provided in controlling communication with one of more of the elements of the apparatus, including the build plate 110, the source of precursor material 120, the radiation source 130, and the plurality of magnetic field sources 142 to control operation of the apparatus according to instructions for generating a three-dimensional part in a layer-by-layer manner. (See FIG. 9.) In many or most embodiments, computer aided design files are provided to define the part architecture being produced. Computer aided design files (for example, .stl files) for the desired part can be generated in any desired manner, as known in the art. Design files can have other formats, such as .jpeg or .tiff. The processor unit includes instructions to control the apparatus, for example, G-code or the like, to achieve production of the desired part according to the design files.

Figure 6:
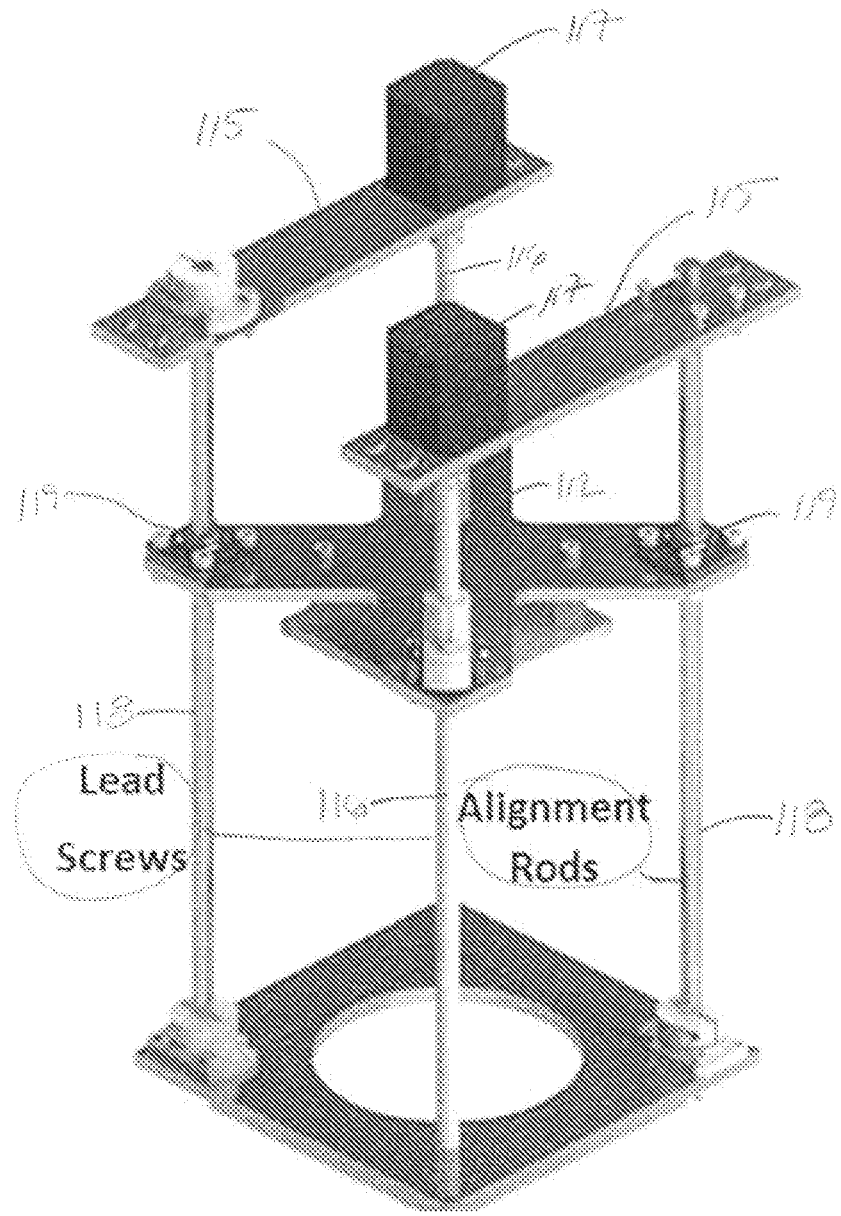
FIG. 6 is an isometric view of the linear movement system.
Figure 7:
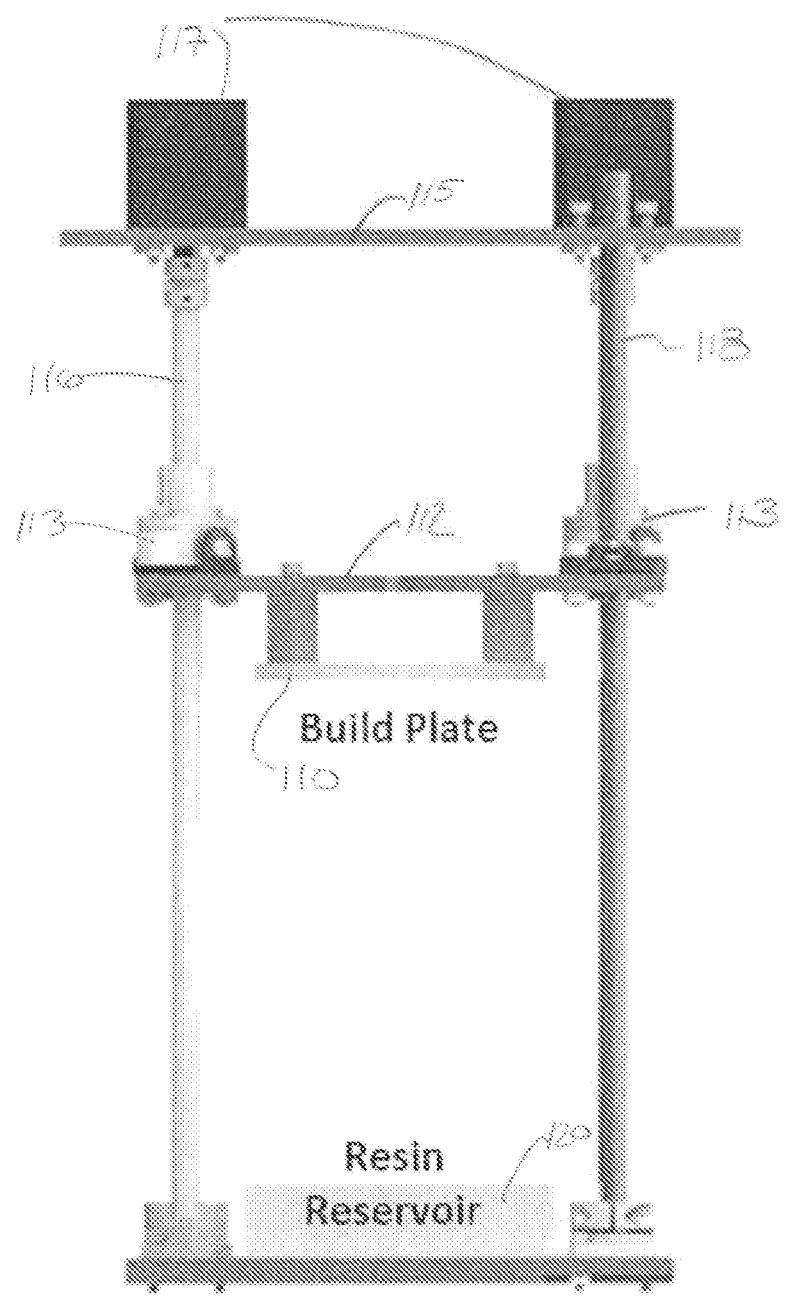
FIG. 7 is a front view of the build plate, precursor source, and linear movement system of FIG. 2.
Figure 8:
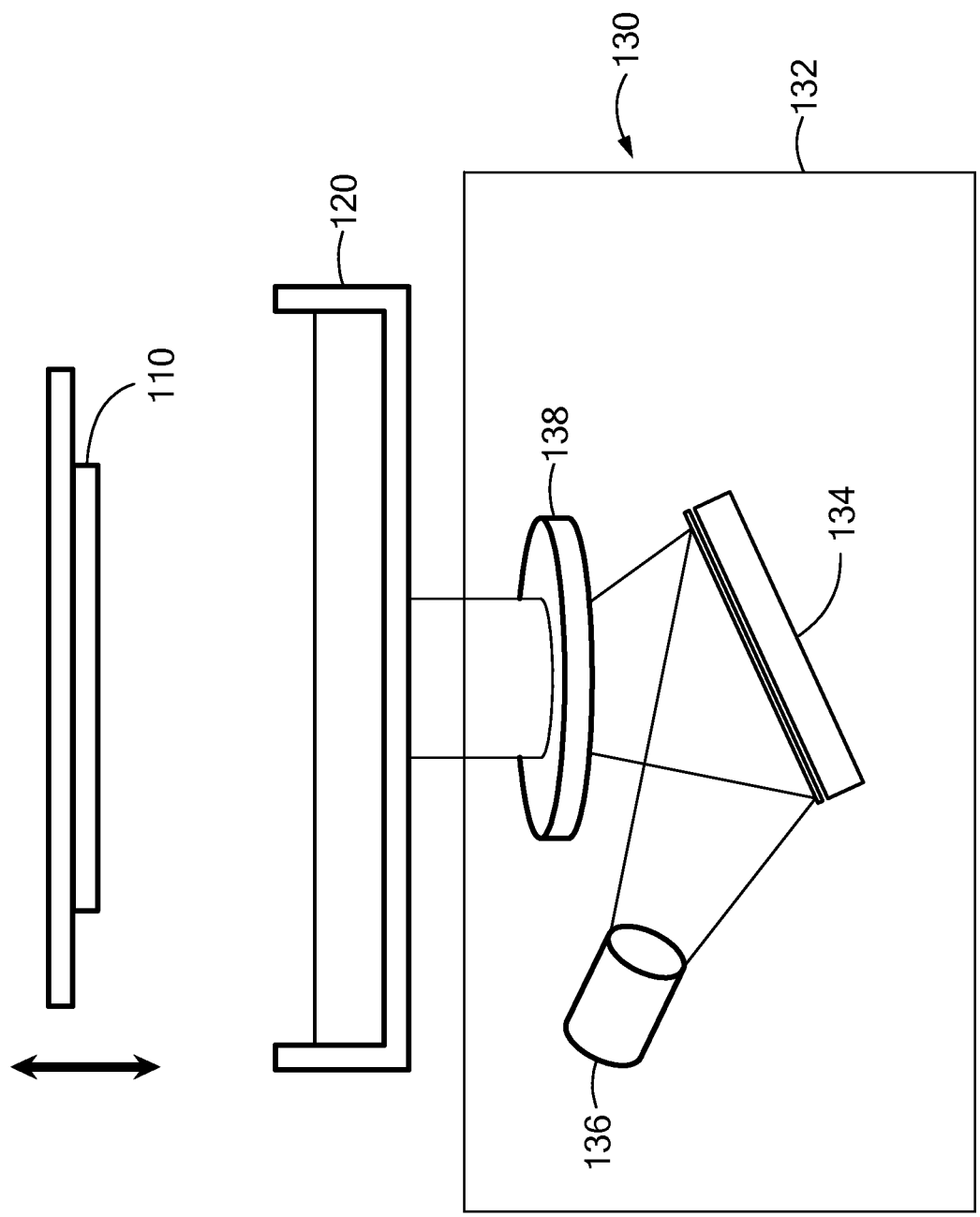
FIG. 8 is an exploded schematic view of an embodiment of a digital light processor of the radiation source of FIG. 2.
Figure 9:
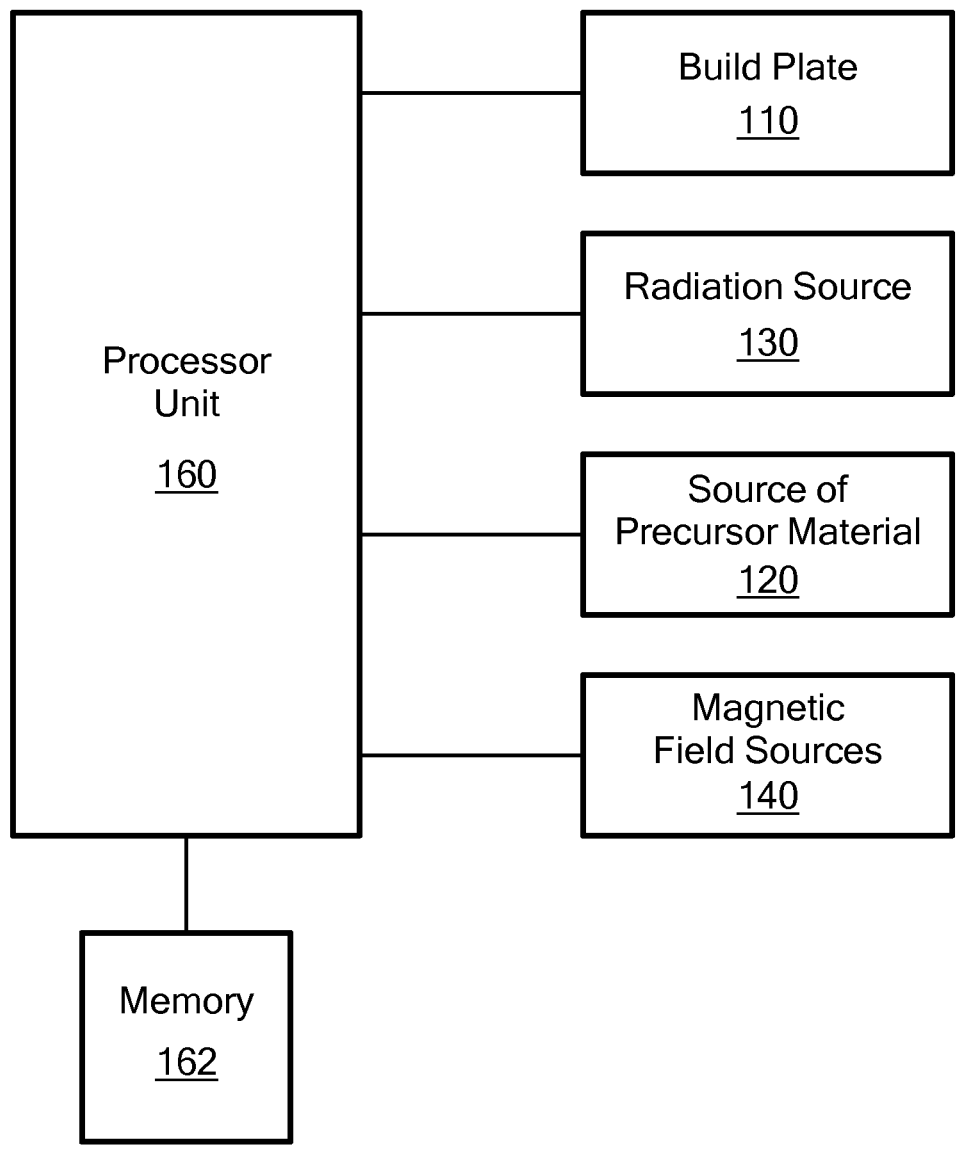
FIG. 9 is a schematic block diagram of a processor unit for use with the apparatus of FIG. 2.

Referring more particularly to FIGS. 6-7, one embodiment of the apparatus includes a build plate 110 supported for vertical movement with respect to a frame 102. A source of the precursor material, such as a reservoir 120, is supported by the frame below the build plate, such that the build plate can be lowered into the reservoir. A radiation source 130, described further below, is located to apply radiation to a build layer of precursor material that is adjacent to the build plate when submerged in the reservoir. A magnetic field system 140 is provided surrounding the build plate to apply a magnetic field of any desired orientation to the build layer.

The build plate 110 can be supported in any suitable manner for vertical movement with respect to the reservoir of precursor material. In one embodiment, the build plate is suspended from a movement assembly 111 having an X-shaped gantry 112 that is mounted to a lead screw mechanism 114. More particularly, one arm of the X-shaped gantry is mounted at both ends by nuts 113 or other attachment elements for linear movement along two diagonally arranged lead screws 116. Each lead screw can be rotated by a motor 117, such as a stepper motor, coupled to its upper end. The other arm of the X-shaped gantry is mounted for following linear movement along two diagonally arranged alignment rods 118 or guide rods. The lead screws and alignment rods are suitably supported and fixed at their lower ends to a support plate of the frame, for example, with linear bearing supports. An upper end of each lead screw is fixed to an upper end of one of the alignment rods by a suitable plate member 115. When it is desired to raise or lower the build plate, the stepper motors are actuated, rotating the lead screw, causing linear motion of the gantry via the nuts 113. During a peel operation, one end of the build plate is lifted slightly vertically to impart a tilt to the build plate. Then the other end of the build plate is lifted until the build plate is again level. The action of tilting the build plate causes the recently consolidated build layer to detach from the build plate. Self-aligning bearings 119 can be used to attach the gantry arm to the alignment rods to ensure a smooth and repeatable peel function. The build plate can include a non-stick coating to assist in detachment of the build layer if desired.

Once a build layer adjacent the build plate 110 has been suitably consolidated, which may take a number of steps, depending on the number of orientations of the particles to be achieved within the build layer, the build plate is tilted in a peel operation, as described above, to detach the just-consolidated build layer from the build plate. The build plate is leveled so that it is spaced above the just-consolidated build layer, and further liquid precursor material in the reservoir flows in to fill the space.

It will be appreciated that any form of support or movable stage for the build plate and any type of linear actuation to move the build plate vertically can be used. For example, an arrangement of hydraulic or pneumatic cylinders can be provided to lift or lower the gantry. The gantry can also have other configurations. Also, the source of precursor material could be movable while the build plate remains stationary.

The magnetic field system 140 includes a plurality of magnetic field sources 142a, 142b, 142c, 142d, 142e that can each provide a magnetic field of variable strength and gradient. Each magnetic field source can be independently controllable, and multiple sources can be simultaneously controllable, such that a magnetic field of any orientation can be applied to the build layer adjacent the build plate in the reservoir.

In one embodiment, each magnetic field source 142 is a solenoid electromagnet formed from a coil 144 surrounding a core region 146. Several solenoids (four—142a, 142b, 142c, 142d—are used in the embodiment shown) are disposed in a horizontal plane about the periphery of the reservoir such that the axis of each coil is parallel to a plane of the build plate. The horizontal solenoids can be equally spaced about the reservoir, as shown. Each of the horizontal solenoids can include an iron core to increase the strength of its magnetic field. A vertical solenoid, 142e, in which the axis of its coil is vertical or orthogonal to the build plate, is provided below the reservoir. Because the vertical solenoid is spaced more closely to the build layer than the horizontal solenoids, its core region 146e can be left open and free of an iron core and still provide a magnetic field of sufficient strength. In this manner, radiation from the radiation source can pass through the core region of the vertical solenoid to reach the build layer adjacent the build plate. The solenoids are fixed to the frame of the apparatus in any suitable manner.

The solenoids 142 are controllable under control of the processor unit 160, which can control the strength and duration of the magnetic field applied by each solenoid to apply a magnetic field in any three-dimensional orientation through the build layer. In this manner, the magnetic particles can be given any orientation desired according to the instructions for the part to be produced. In addition, the magnetic field can be temporally controllable so as to align the second axis of, for example, platelet particles such as with a rotating magnetic field. The magnetic field can be maintained until the build layer has been sufficiently solidified by the radiation source, described further below.

It will be appreciated that any other suitable magnetic field system can be used. For example, the magnetic fields can be applied from permanent magnets, magnetic tapes, hand held magnets, or current-carrying wires. The magnetic field sources can be attached in other locations near the build plate of the system or in the space around the material during the manufacturing process. In the embodiment described above, an additional vertical solenoid could also be provided above the reservoir and the build plate, if desired. Such an additional vertical solenoid would also need to be moved with each peel operation and lift of the build plate. As solenoids tend to be heavy, larger motors can be used if necessary.

The radiation source 130 is capable of focusing radiation on selected voxels within the build layer of precursor material adjacent the build plate, as described above. (See FIG. 1.) The radiation source is actuated according to the instructions given to the processor unit.

In one embodiment, the radiation source 130 comprises a digital light projector 132 that includes a number of micromirrors 134, or microscopic mirrors, arranged in a pixel array on a chip. The micro-mirror array corresponds to the XY resolution of the voxels in the build layer of the precursor material. A light source 136 is positioned to illuminate the micro-mirrors, which reflect the radiation toward the build layer. A lens or lens system 138 is provided to focus the radiation upon the build layer adjacent the build plate 110. In particular, the mirrors can be individually repositioned or toggled between on and off positions, such that the on position directs and focuses radiation from the radiation source onto a corresponding voxel within the build layer. Illumination is controlled by the processor unit provided using the data file describing the part to be produced, for example, by specifying which voxels to irradiate. In this manner, only selected voxels are illuminated to cure or otherwise consolidate the matrix material during any one step. The micro-mirrors can be of any suitable individual pixel size, and any size pixel array can be provided, depending on the application.

The light source 136 can provide radiation of any desired wavelength to cure the particular matrix material being used to produce the part. In some embodiments, the wavelength can range from ultraviolet to visible to infrared radiation. In some embodiments, the wavelength can range from 300 nm to 900 nm in wavelength. The light source can be, for example, a xenon arc lamp, an LED, or a laser.

The time interval of irradiation can be controlled by the processor unit 160. The time interval depends on parameters such as the particular matrix material and the thickness of the build layer, so that each voxel is irradiated for a sufficient duration to ensure that the matrix material is solidified to the desired degree.

Other types of light projectors or light processing devices can be used. For example, a scanning micro-mirror or laser device can be used.

In some embodiments, the processor unit 160 is part of a computer system such as a personal computer, workstation, or server. The computer system can be implemented with computer-executable instructions, such as program modules, which can include routines, subroutines, programs, objects, components, data structures, and the like that perform particular tasks or operate on data. Other computer system configurations can be used, including hand-held devices, wireless devices, smart phones, tablet and laptop computers, multiprocessor systems, microprocessor-based or programmable consumer electronics, minicomputers, mainframe computers, and the like. The computing environment can include a network, such as an intranet, local area network, wide area network, the Internet, and the like. The computer system can be a distributed computer system in which some program modules and memory are located remotely and some tasks can be performed by remote devices linked via a communications network. The computer system can include a variety of hardware elements, including one or more processing units, memory and a system bus that operatively couples the various system components including the memory to the processing unit(s). There may be one or a plurality of processors, such that a processor unit comprises a single central processing unit (CPU) or a plurality of processing units, such as a multiprocessor or parallel processor. The term "processor unit" as used herein includes any or all of these options and architectures.

In addition to the embodiment described above, the use of magnetically responsive particles to form a composite part can be employed with a variety of additive manufacturing processes and equipment, such as other stereolithography systems, 3D printing systems, direct-write systems, selective laser sintering, and fused deposition modeling.

The method described herein can be applied to any material system (matrix material and magnetically responsive particles) that is compatible with the chosen additive manufacturing process and apparatus. Suitable matrix materials include, without limitation, a photocurable acrylic material, a polymethylmethacrylate (PMMA) material, or a polyurethane material. In some embodiments, the viscosity of the matrix material prior to consolidation can range from 0.7 mPa·s to 10 Pa·s. The magnetically responsive particles can be well dispersed within the matrix material, for example, by ultrasonification or mechanical stirring.

In one example, a material system uses a resin comprising an acrylic based photopolymer with reinforcing aluminum oxide ($Al_2O_3$) micro-platelets particles that are labeled with iron oxide ($Fe_3O_4$) nanoparticles to make them susceptible to magnetic fields. More particularly, in one example, UV-sensitive resin was made by first mixing aliphatic urethane diacrylate (Ebecryl® 230) and isobornyl acrylate (IBOA—Sigma) in a 1:3 ratio by weight. Photo-initiators were added at 2% and 3% weight, respectively, and stirred overnight. The viscosity of the polymer blend was measured using an Ubbelohde viscometer (SimpleVIS, size 2C) and was found to be 140 cps. Magnetized reinforcing particles ($Al_2O_3$) were added to the resin at the desired volume fraction and sonicated in volumes of 30 mL using a microtip sonifier (Branson 250, 20% duty cycle, 40 W output for 10 minutes) to ensure monodispersity. Finally, the resulting mixture was degassed to remove all dissolved gasses to prevent bubbles from causing defects during the printing process.

In some embodiments, the magnetically responsive particles have a longest dimension ranging from 200 nm to 1000 µm. In some embodiments, the magnetically responsive particles have a longest dimension ranging from 1 µm to 20 µm. In some embodiments, the magnetically responsive particles have an aspect ratio ranging from 2 to 200.

The magnetically responsive particles can be magnetically responsive due to the particle itself being magnetic or the particle being coated with a material that itself is magnetic. Non-magnetic particles that can be coated with magnetic material can include, without limitation, ceramics, metals, and polymers, such as but not limited to, calcium phosphate, glass ($SiO_2$), aluminum oxide ($Al_2O_3$), boron nitride, copper, magnesium aluminum, gold, silver, polystyrene, and the like. Particles can have a wide variety of geometries, including discontinuous fibers, rods, platelets, flakes, or whiskers. Particles are typically anisotropic in shape in at least one dimension, although spherical particles can be used in some embodiments, depending on the application.

Magnetic fillers or particles can include, for example, iron-oxide nanoparticles, iron filings, superparamagnetic microbeads, cobalt flakes and nickel rods. Magnetic particles can have a wide variety of geometries, including microbeads, nanoparticles, filings, fibers, rods, platelets, flakes, or whiskers. A surface coating of a non-magnetic particle can be provided by chemisorption, physisorption or evaporative processes.

Non-magnetic micro-particles can be magnetically labeled with magnetic nanoparticles, such as iron-oxide nanoparticles, by known techniques. Such labeling can be applied to particles having a diverse assortment of materials and geometries. In one example, to magnetize $Al_2O_3$ (alumina) particles, 375 µL of superparamagnetic iron oxide nanoparticles (EMG 705, 3.9% vol $Fe_3O_4$, Ferrotec,) is titrated with 10 grams of $Al_2O_3$ in 200 mL of deionized water to ensure a homogenous coating of the micro-particles. The mixture is stirred overnight using a magnetic stir bar. A negatively charged ligand-coating on the iron oxide allows the nanoparticles to electrostatically adsorb to the surface of the alumina particles. The particles are subsequently, filtered and dried. Once drying is complete, the magnetized alumina particles can be added to a photopolymer or other matrix material at any desired volume fraction.

Figure 11:
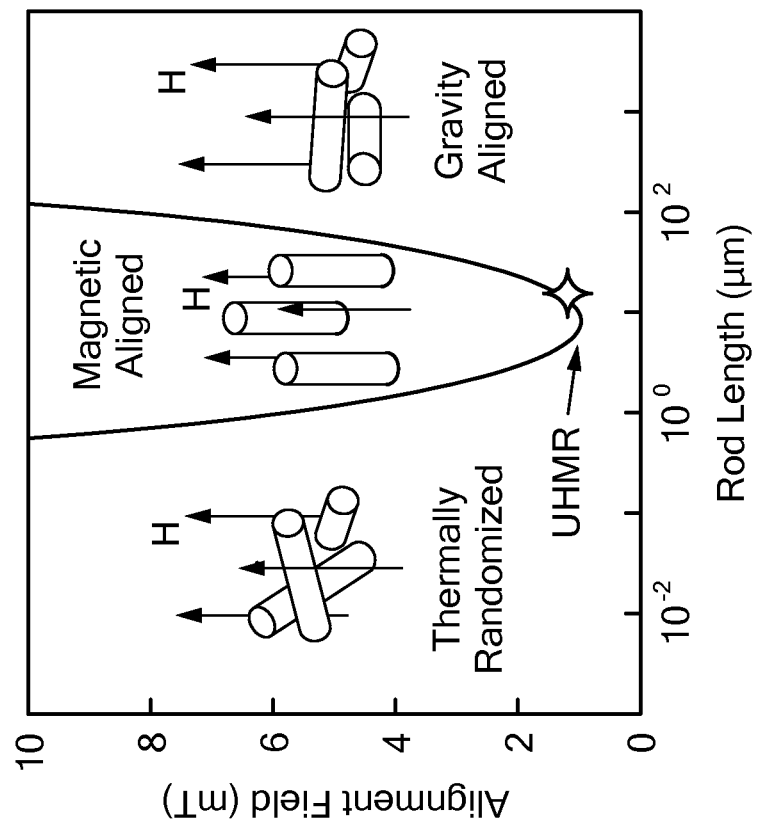
FIG. 11 is a graph illustrating the ultrahigh magnetic response of surface-magnetized rods.
Figure 10:
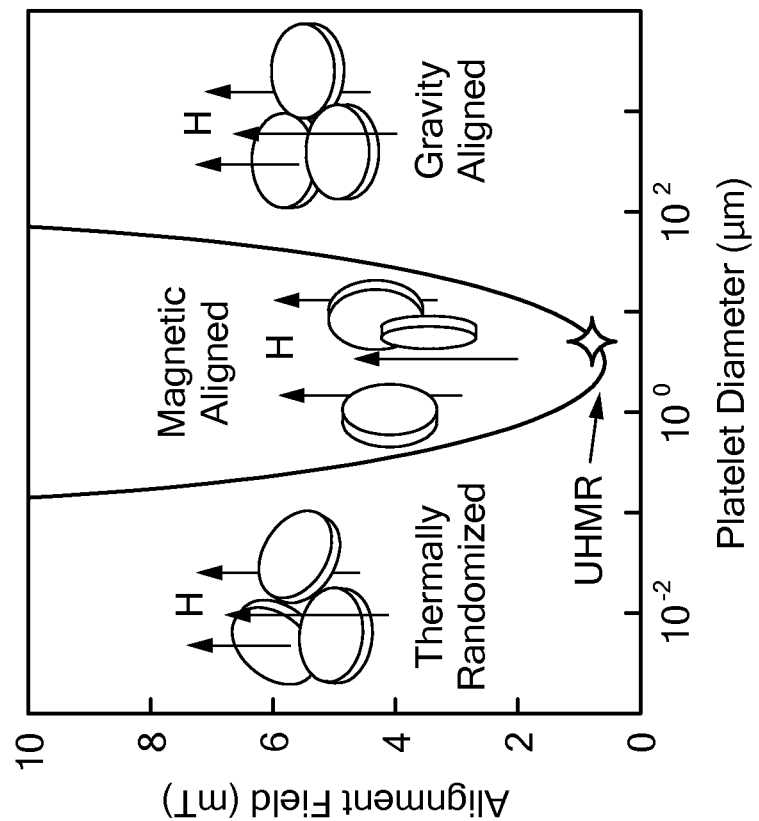
FIG. 10 is a graph illustrating the ultrahigh magnetic response of surface-magnetized platelets.

Particles with length scales ranging from 200 nm to 1000 µm can be magnetically labelled to provide an optimally strong magnetic response in the present method. Magnetic forces operate in competition with body forces (gravitational and viscous drag) as well as atomic and molecular forces (Brownian motion). Larger particles experience a significant body force due to volumetric phenomena like gravity, shear, etc. that can dominate colloidal magnetic assembly. Similarly, significantly small particles can be dominated by Brownian motion that works to disrupt assembly. The range of particle size that results in an optimum magnetic response depends on several factors, such as particle dimensions, density, magnetic susceptibility, fluid viscosity, and the strength of the applied magnetic field. For example, the phase diagrams of FIGS. 10 and 11 demonstrate the size as a function of alignment field for particles with a surface coating of as little as 0.5% vol. In particular, FIGS. 10 and 11 are graphs of the magnetic response of surface-magnetized platelet particles and rod-shaped particles. The theoretical minimum alignment field, $H_{min}$, is plotted for platelets, aspect ratio s=37, in FIG. 10, and for rods, aspect ratio s=30, in FIG. 11. The particles have a surface coating of magnetic nanoparticles of 0.5 vol. %. Specific gravity values of 3.98 and 2.5 g/cm$^3$ were used in the calculations, consistent with the experimentally studied alumina platelets and calcium sulfate rods, respectively. See Erb, R. M., Libanori R., Rothfuchs, N., Studart, A. R. Composites Reinforced in Three Dimensions by Using low Magnetic Fields. *Science* 2012, 335 (6065): 199-204.

Figure 12B:
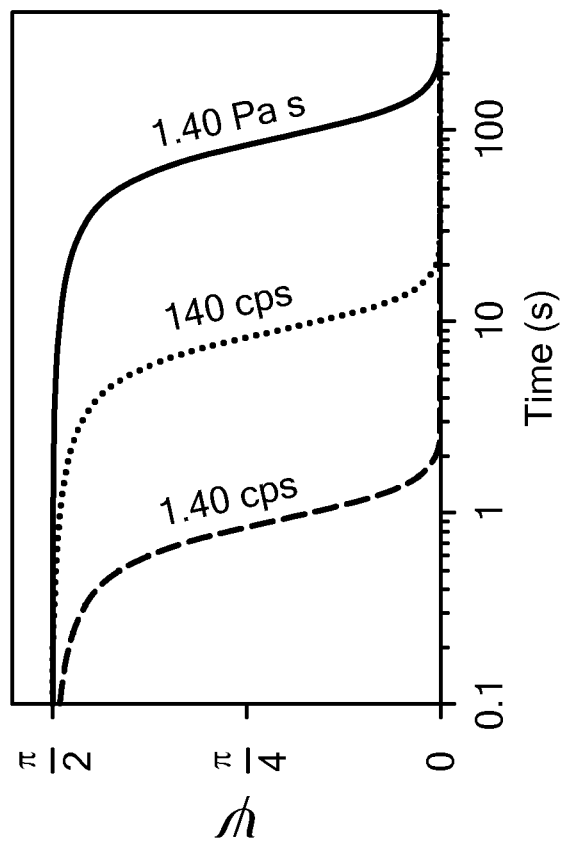
FIG. 12B is a graph illustrating viscous drag on a particle in a fluid subjected to a magnetic field.
Figure 12A:
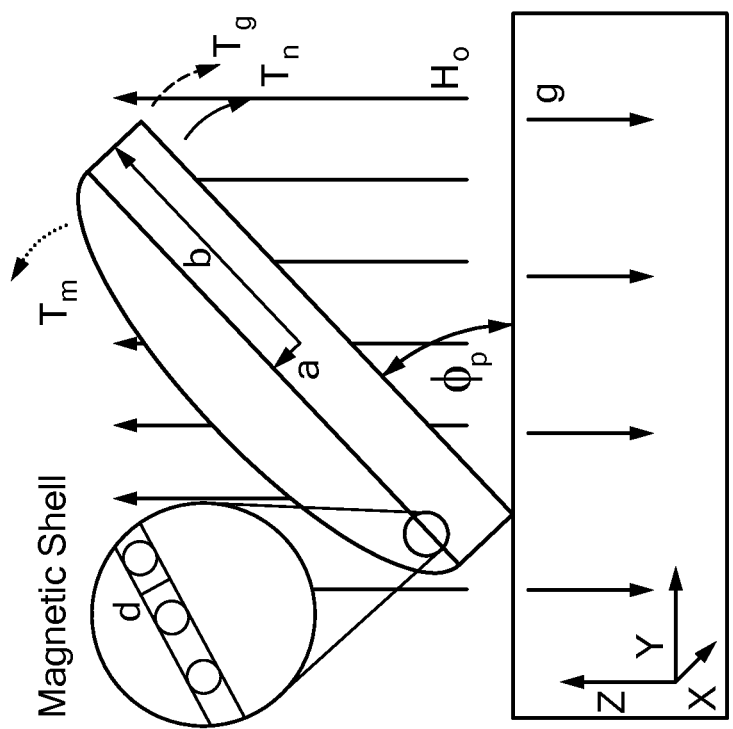
FIG. 12A is a schematic diagram illustrating behavior of a particle in a magnetic field.

By way of further explanation, reference is made to FIGS. 12A and B. By interpreting the alumina platelets as oblate ellipsoids, the motion of a magnetized platelet suspended in a fluid can be described using analytic expressions. When a magnetic field is applied, the platelet experiences a magnetic torque that works to align the long axis of the platelet with the field. This torque is applied to the platelet by a similarly sized ellipsoidal shell, and can be described by:

$$T_{magnetic} = \frac{2\pi\mu_o \chi_{ps}^2}{3(\chi_{ps}+1)}[(A+d)(B+d)^2 - AB^2]H_o^2 \sin\psi\cos\psi \quad (1)$$

Here $\mu_o$ is the permeability of free space ($\mu_o=4\pi\cdot10^{-7}$, units of [N/A$^2$]), $\chi_{ps}$ is the volume susceptibility of the particles (dimensionless), $H_o$ is the external magnetic field (units of [A/m]), and $\psi$ is the angle of the long axis of the particle to the vertical axis. This magnetic torque is balanced by the viscous drag the platelet experiences as it rotates in the fluid, which works against platelet motion and can be expressed by:

$$T_{viscous} = -6\eta V\left(\frac{f}{f_0}\right)\left(\frac{d\psi}{dt}\right) \quad (2)$$

where $f/f_0$ is the Perrin friction factor and can be solved analytically. Balancing the magnetic and shear torques applied on a suspended platelet allows for the calculation of the platelets angular acceleration:

$$\frac{d^2\psi}{dt^2} = \frac{T_{net}}{I} = \frac{5(T_{mag}+T_\eta)}{m(A^2+B^2)} \quad (3)$$

Here m is the mass of the particle and I is the moment of inertia of an unpinned ellipsoid. Substituting the torques into Eq. 1 leads to a non-linear, second order differential equation that can be solved using, for example, Matlab. Numerical solutions were used to estimate the required time for orientation during the fabrication process.

A number of experiments were conducted in which samples of composite materials were produced according to an embodiment of the method described herein.

Example 1

The feasibility of aligning microscopic particles using magnetic assembly polymer matrices was evaluated with UV curable resins due to their low viscosity and controllable polymerization. Tests were conducted on an N-Scrypt 3Dn table top series modified with a 365 nm light source. A permanent magnet was employed to apply a magnetic field in different directions. Two different fillers were investigated: calcium phosphate rods and alumina ($Al_2O_3$) platelets. The resin system employed was alkoxylated pentaerythritol tetraacrylate (Sartomer) with 1 wt % Irgacure 184 (Ciba, Transparent photoinitiator), ~1% volume $Al_2O_3$ platelets or calcium phosphate rods. Samples were made using both a stereolithography (SLA) technique by aligning particles in a container filled with resin and a technique of aligning particles while printing with a micro-nozzle.

Particles aligned in the bulk resin container were allowed 5 minutes to align in the magnetic field before polymerization. For the printed alignment experiments, particles were only given 30 seconds to align. All images are taken at 5× with an optical microscope with transmitted illumination.

Successful alignment was achieved with alumina platelets and calcium phosphate rods in two different orientations using the stereolithography technique with bulk resin polymerization. FIGS. 13A and 13B illustrate the experimental setup for the bulk alignment experiments of the platelets with vertical (FIG. 13A) and horizontal (FIG. 13B) fields. FIG. 13C illustrates schematically the vertical alignment of the platelets (corresponding to FIG. 13A), and FIG. 13D illustrates schematically the horizontal alignment of the particles (corresponding to FIG. 13B). FIG. 13E is a photomicrograph of a top view illustrating the vertically aligned platelets, and FIG. 13F is a photomicrograph of a top view illustrating the horizontally aligned platelets. FIG. 14A illustrates schematically the vertical alignment of the rods, and FIG. 14B illustrates schematically the horizontal alignment of the rods. FIG. 14C is a photomicrograph of a top view illustrating the vertically aligned rods (out-of-plane, or perpendicular to the stage), and FIG. 14D is a photomicrograph of a top view illustrating the horizontally aligned rods (in-plane or parallel to the stage).

Additionally, successful particle alignment in two different orientations for alumina platelets using a micro-nozzle printing method was demonstrated. See FIGS. 15A-F. FIG. 15A illustrates the experimental setup. FIG. 15B illustrates the resulting part. FIG. 15C illustrates schematically the vertical alignment of the platelets, and FIG. 15D illustrates schematically the horizontal alignment of the platelets. FIG. 15E is a photomicrograph of a top view illustrating the vertically aligned platelets (out-of-plane, or perpendicular to the stage), and FIG. 15F is a photomicrograph of a top view illustrating the horizontally aligned platelets (in-plane or parallel to the stage).

Examples 2-4

Magnetically responsive reinforcing particles were prepared as follows: Alumina ($Al_2O_3$) platelets (obtained from Allusion) were electrostatically coated with approximately 5% surface coverage superparamagnetic iron oxide ($Fe_3O_4$) nanoparticles (EMG 705, obtained from Ferrotec). 10 grams of alumina powder was added to 200 mL of deionized water and stirred vigorously. 375 µL of EMG 705 was then dispersed in 60 mL of deionized water and slowly added to the stirring mixture of particles. After allowing to mix overnight, the particle mixture was filtered and then dried.

The resin was a polymer blend consisting of isobornyl acrylate (IBOA, from Sigma) and an aliphatic urethane diacrylate (Ebecryl 230, from Allnex). The resin solution consisted of two photoinitiators, 1-hydroxycyclohexyl phenyl ketone (99%, Sigma) and phenylbis(2,4,6-trimethylbenzoyl)phosphine oxide (97%, Sigma); at 3% and 1.5% wt., respectively. Once the resin was thoroughly mixed, selected amounts of magnetic alumina platelets were added.

Preliminary results were gathered using a stereolithography printer kit ordered from mUVe and an nScrypt 3dn dispensing system. The mUVe kit was fitted with a custom stage and laser system to accommodate non-commercial resins and the magnetic fields.

A part with multiple discrete architectures within a single layer was produced. FIGS. 16A-E illustrate a miniature chess board that was produced with two different orientations within one layer, demonstrating changes in optical properties. The more opqaue regions have platelets oriented in-plane, absorbing more light than the more transparent regions, which are oriented out-of-plane. The difference in color comes from the orientation of the platelets; the film has a homogenous concentration. FIG. 16B illustrates an optical microscopy image at 10× magnification of out-of-plane alignment; FIG. 16C illustrates an optical microscopy image at 10× magnification of in-plane alignment. The corresponding platelet orientations are schematically illustrated in FIGS. 16D and E.

Composite parts with multiple layers containing programmable orientations have also been demonstrated. For example, a 1×1×0.25 cm block was fabricated with both in-plane and out-of-plane particle alignment. See FIGS. 17A-F. FIG. 17A is a photograph of a block with 10% vol. magnetically responsive platelets. FIG. 17B is a schematic illustration of the orientation diagram used to program and fabricate the block. Scanning electron microscopy images verify the in-plane and out-of-plane orientations at the interfaces (FIGS. 17C and D), while FIGS. 17E and F provide closer analysis of each orientation.

Figure 18:
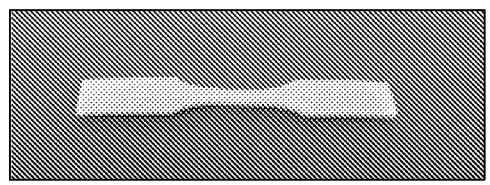
FIG. 18 is a photograph of a dogbone having 10% alumina particles formed according to an embodiment of the present method for tensile testing.
Figure 19:
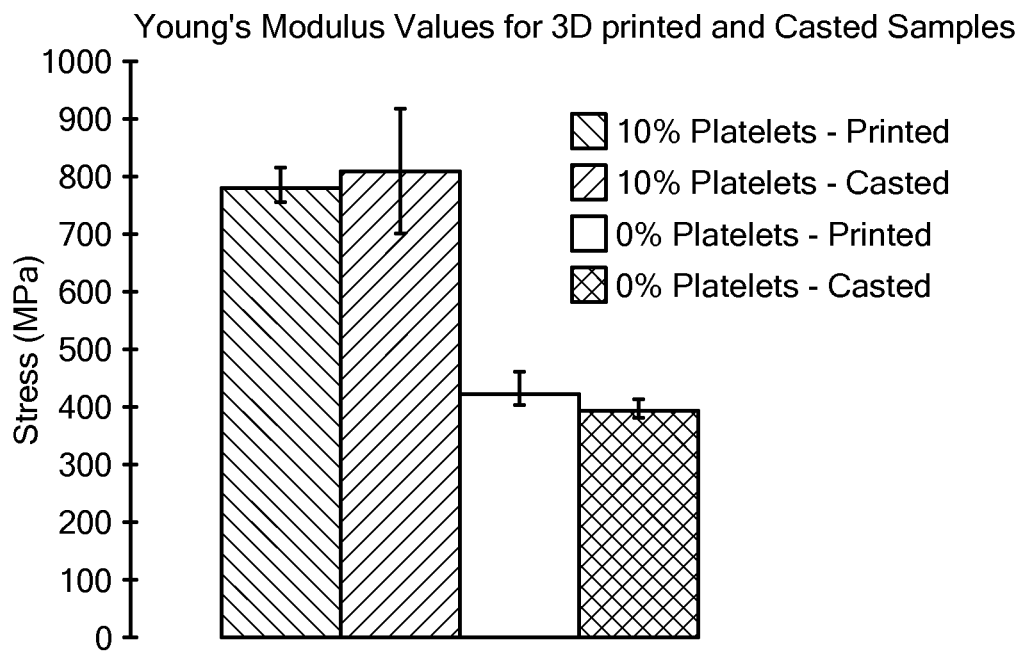
FIG. 19 is a bar plot with standard deviation comparing the Young's modulus of dogbone specimens made by an embodiment of the present method and by a tape casting method.

The effect of reinforcement orientation on mechanical properties has also been investigated. Dogbone specimens (see FIG. 18) for tensile testing were fabricated with 10% volume alumina platelets at various alignments. The specimens with alumina platelets (unoriented) demonstrated a Young's modulus approximately 100% greater than printed dogbones without reinforcing platelets, as indicated in FIG. 19.

Figure 20:
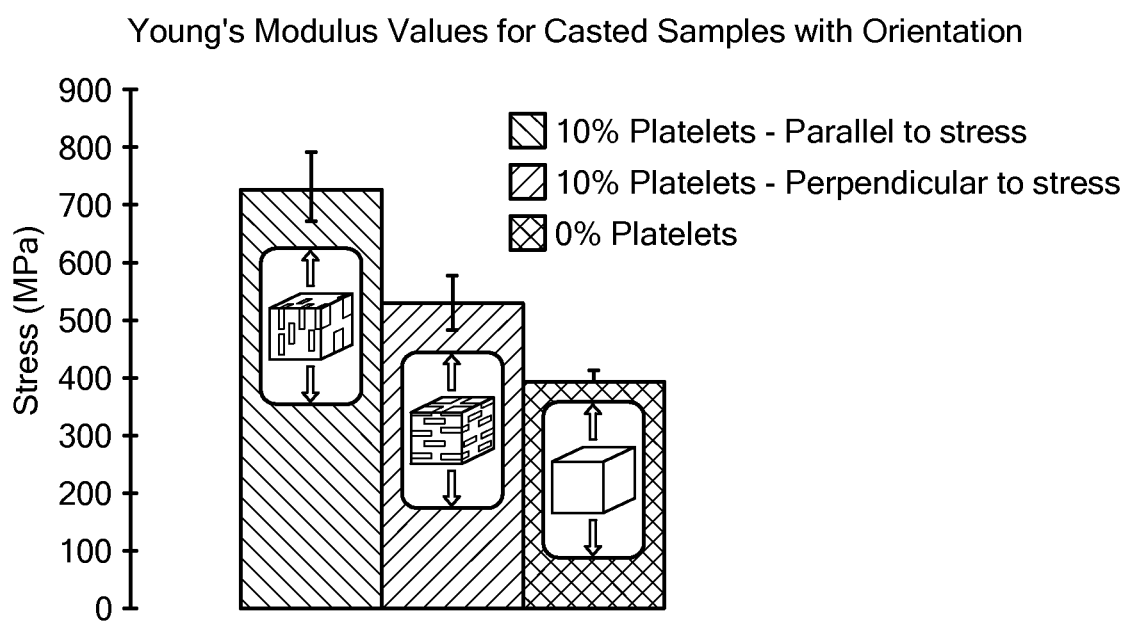
FIG. 20 is a bar plot with standard deviation comparing the Young's modulus of dogbone specimens with different platelet orientations made by a tape casting method.

The importance of fiber architecture on mechanical properties such as stiffness is illustrated in FIG. 20. The Young's modulus of samples with fibers aligned in the direction of the applied stress is roughly 40% greater than samples with fibers aligned perpendicular to the applied stress.

In the following Examples, an apparatus substantially as described above with respect to FIGS. 2-9 was provided, using open-source software (Creation Workshop) to control a digital light projector (ViewSonic PJD7820hd) and two NEMA-17 stepper motors for the vertical or z-axis motion. The software converts .stl files to a series of high-resolution vector files that are used to polymerize each cross section. The frame (from mUVe3D) was modified to allow for the application of magnetic fields by either a rotating rare-earth magnet or computer-controlled solenoids.

In the method, rotating magnetic fields (3 Hz) were applied with a magnitude of 400 G to achieve the desired alignment of the reinforcing particles in the resin. Proper alignment took 15 seconds. The layer was then exposed and selectively polymerized using UV light. Multiple orientations were achieved in a single layer by repeating the process of orientation and polymerization. Once a layer was complete, the build plate was lifted in a peel function and fresh resin flowed in between the previous layer and the resin container. This process was repeated layer by layer until the part was complete. Completed parts were rinsed in isopropyl alcohol and post-cured in a UV chamber (UVL-56, 6 W, 365 nm) for 30 minutes followed by a heat treatment (90° C. for 1 hour) to relieve any residual stresses.

Example 5

Figure 21:
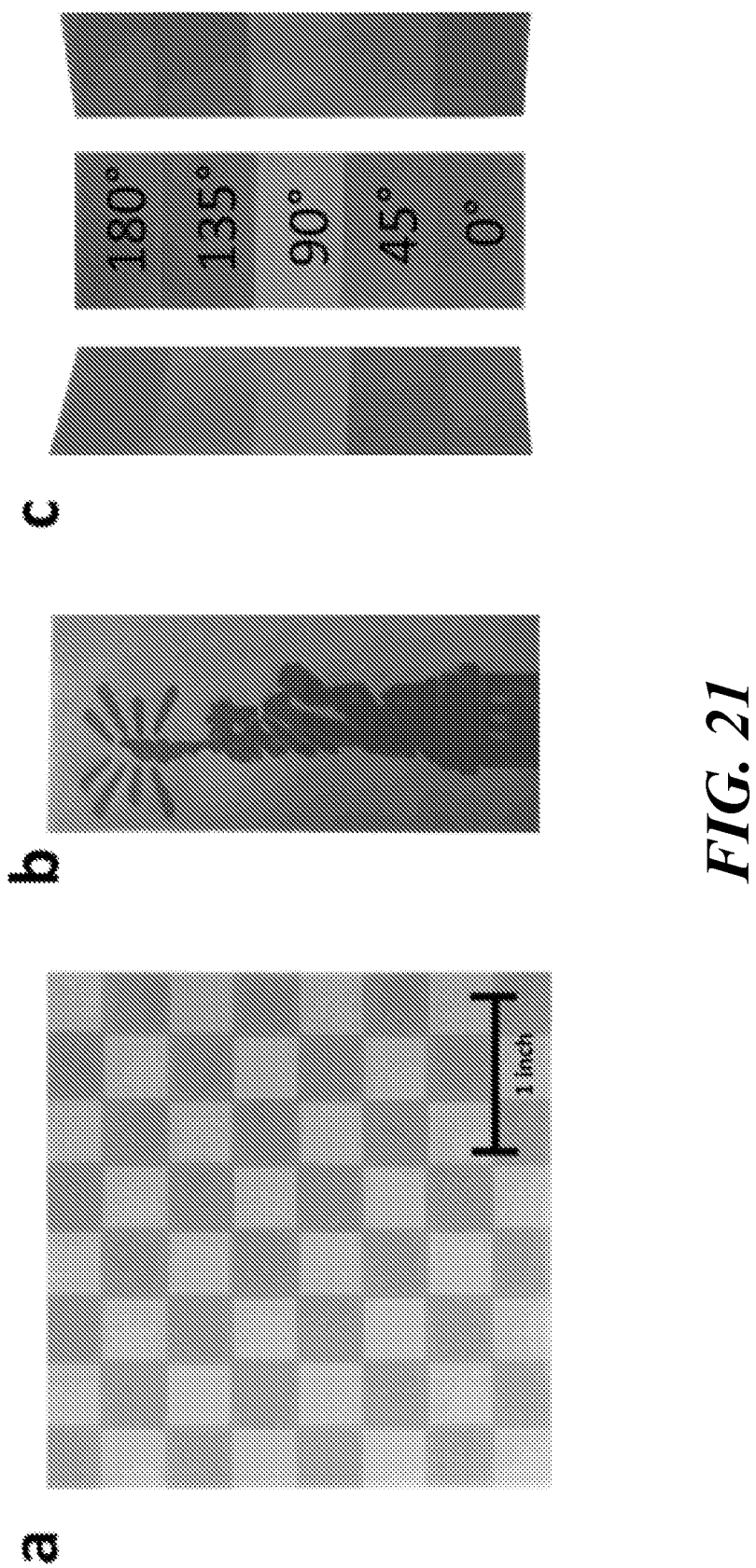
FIG. 21 is an illustration of a checkerboard, an image of the Statue of Liberty, and an image of linear bands illustrating varied optical properties provided by varied particle orientation made according to an embodiment of the present invention.

An example of controlling optical properties is illustrated in FIG. 21. A simple checkered pattern and an image of the Statue of Liberty were fabricated within a solid composite block of a urethane/acrylate copolymer directionally reinforced with alumina microplatelets. In the checkered pattern, the reinforcement angles in each square alternate between 0° and 90°. The orientation of the alumina microparticles results in an optical change to the composite surface. In-plane reinforcement scatters more light and appears whiter; out-of-plane reinforcement absorbs more light and appears darker. The process to produce the checkered pattern took a net 2 minutes to product a 2" by 3" composite layer. SEM analysis of the reinforcement microstructure revealed high levels of microparticle alignment in the final composite.

Example 6

Figure 22D:
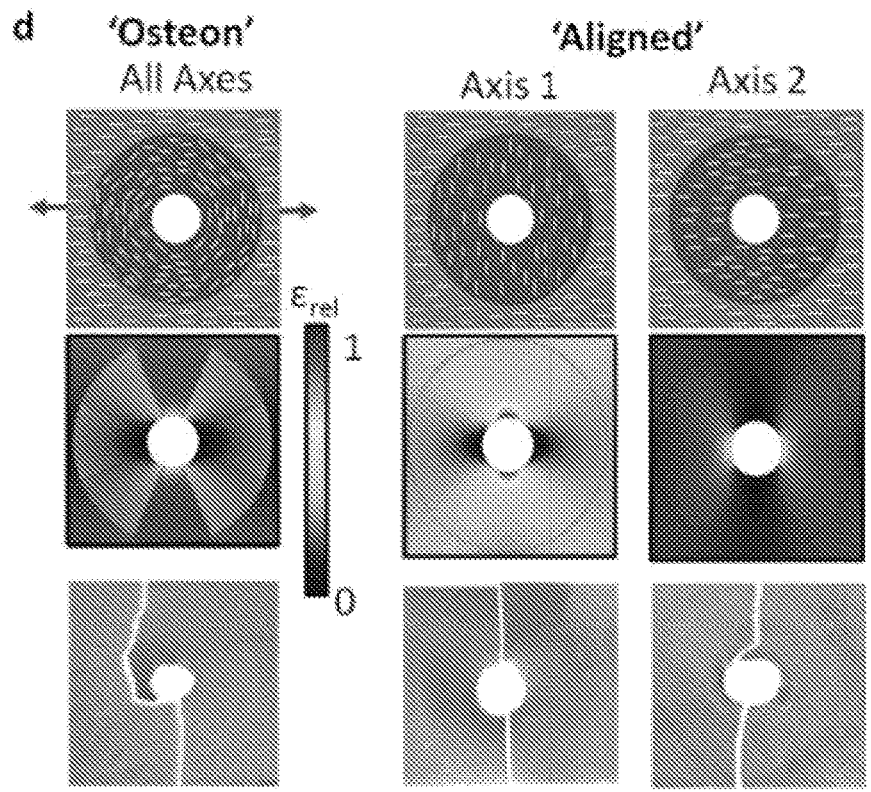
FIG. 22D is illustrations of samples with programmable reinforcement architectures around circular defects.

The ability to tune reinforcement architectures to provide a wide programmability to the stiffness, strength, toughness, and multi-functionality of composite materials was investigated. Monolithic blocks of composite material in which all voxels have the same orientation were prepared and subjected to tensile testing to measure the material strength along each axis (FIGS. 22A, B). Tensile testing along axes aligned with the reinforcement exhibited both enhanced stiffness and ductility, as would be expected from composite theory. A micro-architecture was fabricated and subjected to hardness mapping to measure local material properties and validate that the material properties are maintained in each voxel in a complex architecture. (FIG. 22C). Voxels with reinforcement oriented out-of-plane showed a significant increase in out-of-plane hardness relative to materials with only in-plane reinforcement.

Figure 22E:
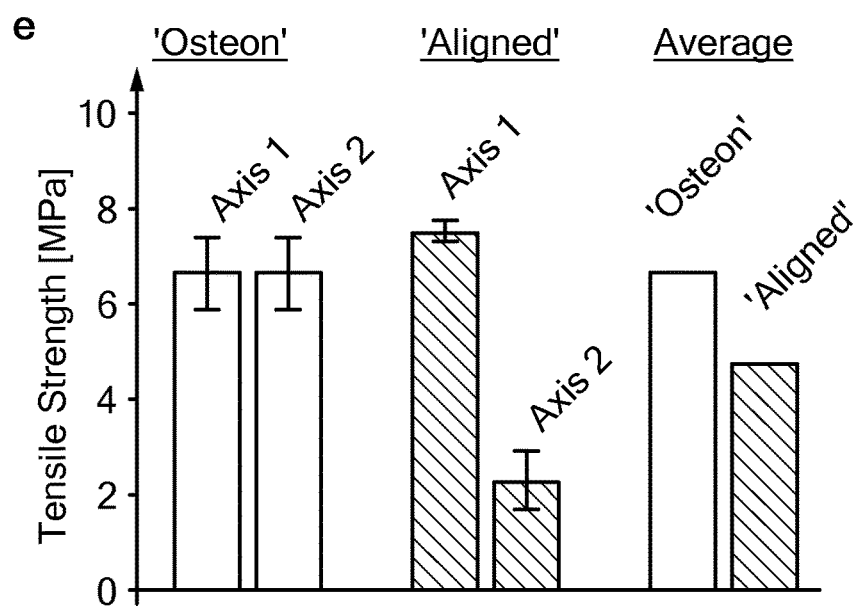
FIG. 22E is a graph of tensile strength along two axes of the samples of FIG. 22D.

To investigate the effects of microstructural design on fracture toughness, structures having openings or circular or cylindrical defects were produced with various reinforcement geometries (FIG. 22D), one geometry being "osteon-inspired," in which the reinforcement circumferentially surrounds the opening, and two with monolithically aligned reinforcement. These architectures were modeled with finite element analysis to observe anticipated strains surrounding the cylindrical defects. The "osteon-inspired" structures with an azimuthal orientation of the reinforcing platelets showed minimum strain concentration independent of the axes in which the stress is applied (FIG. 22E). Using the present method, microstructural reinforcement architectures can be evaluated rapidly along with FEA analysis to optimize the microstructural reinforcement architecture.

Figures 23A, 23B:
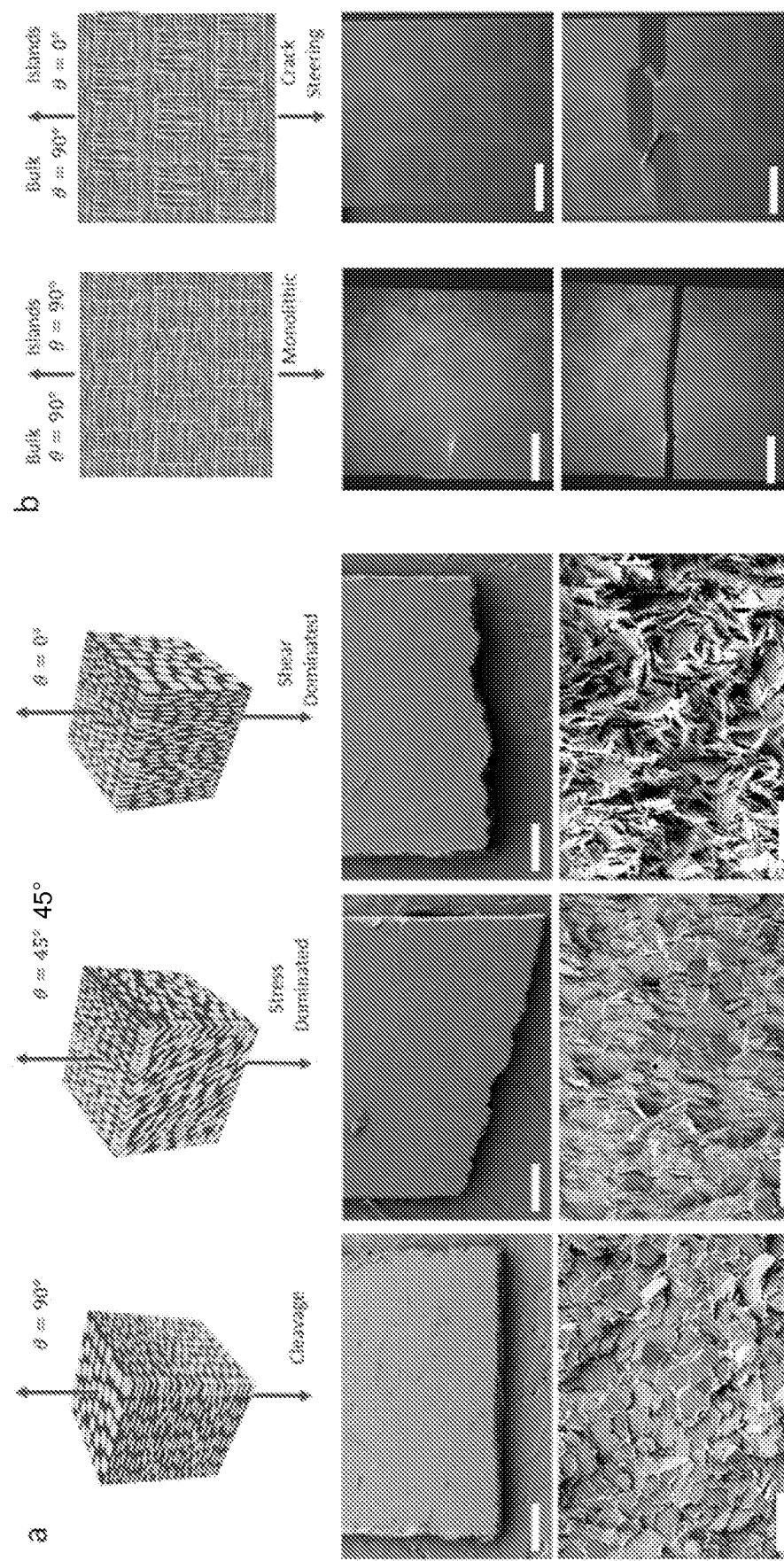
FIG. 23A illustrates mechanical failure mechanisms under various tensile loadings of a three-dimensional monolithic dogbone with reinforcement oriented at different angles, in which scale bars are 500 µm and 25 µm for the top and bottom rows respectively.
FIG. 23B illustrates architectures with islands that match and contrast the reinforcement orientation of the bulk film, in which scale bars are 500 µm.

The osteon structures reveal that the fracture occurs differently in each architecture. The secondary axis of the aligned monolithic structure shows a straight, fast crack propagation related to cleavage while the circumferential architecture shows deviations in the crack propagation path. The present method enables the production of microarchitectures to accentuate crack path deviation. To investigate these effects, monolithic samples were produced with reinforcing particles oriented perpendicular ($\theta=90°$), at acute angles ($\theta=45°$), and parallel ($\theta=0°$) to the applied stress. FIG. 23A illustrates the different failure modes of each sample: brittle, cleavage fracture with minimal plastic deformation and high crack tip strength; stress dominated fracture with angled planes; and shear dominated fracture. Thus, a composite part can be designed voxel-by-voxel to exhibit a particular failure mode given an expected loading to in effect tune crack propagation pathways. FIG. 23B shows structures including islands (500 µm×500 µm) of varying reinforcement orientations. When the island orientation matches the bulk orientation, a monolithic structure is produced and failure mechanisms are predictable. When the island orientation and the bulk orientation contrast, a crack can be steered through the material. Crack steering provides a control toggle over fracture toughening mechanisms in composite microstructures. Failure mechanisms can be programmed into a material to deflect cracks from select areas of a part. In this regard, note that crack propagation in the presence of multiple orientations occurs in the weaker phase, rather than at the interface.

Example 7: Tensile Testing

Figure 24:
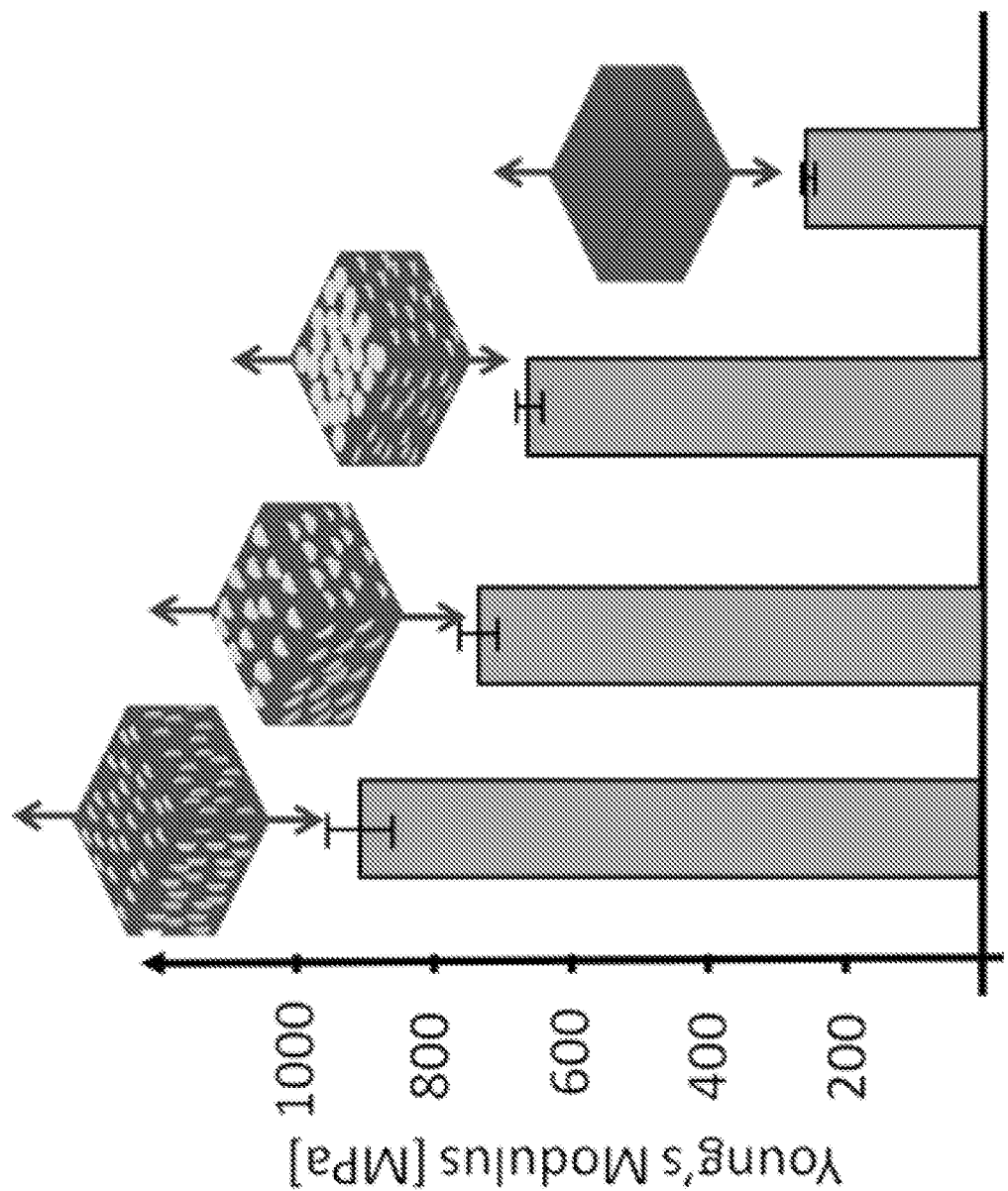
FIG. 24 illustrates Young's modulus for various particle orientations and no particles.

Referring to FIG. 24, the mechanical properties of cured composite resin were tested on specimens prepared by punching out samples from fabricated sheets using an ASTM-D638 IV die. The specimens were tested on a universal testing machine (Instron). Three primary reinforcement orientations were tested: parallel, perpendicular, and at an angle to the applied tensile load, as well as the pure polymer. Composites with 15% vol. reinforcing particles aligned parallel to the load showed an increase in stiffness of more than 300%. Composites with particles oriented perpendicular to the applied load showed an increase in stiffness of 200% vs. the pure polymer.

Example 8: Interface Analysis

Referring to FIGS. 25A-B, tensile tests were conducted on dogbone specimens having 10% volume fraction $Al_2O_3$ platelets, and reinforcement oriented parallel to, perpendicular to, and at 45° from the axis of the applied load. The facture surfaces of each group differed from normal stress dominated fracture for specimens with parallel reinforcement to shear dominated fracture for specimens with 45° alignment, to cleavage for specimens with perpendicular reinforcement. SEM images of the facture surface for each orientation illustrate the effects of reinforcement orientation on crack propagation. Samples reinforced along the axis of the applied load (parallel alignment) demonstrated improved mechanical properties and visible signs of greater yielding. The crack propagated against the reinforcement orientation with no true easy axis and is rough yet random. Samples reinforced at an angle demonstrated crack propagation congruent with the angle of the reinforcing particles. Samples reinforced orthogonal to the applied load demonstrated cleavage due to the crack propagating parallel to the platelets. To demonstrate that boundaries and interfaces do not serve as a defect, tensile specimens were fabricated with parallel alignment except for a small region. When tested, the failure was located at the center of the weaker region, rather than at the interface.

Referring to FIG. 26, dogbone specimens were fabricated with a concentrically-reinforced ("osteon-inspired") hole in the center. Tensile testing results showed an isotropic mechanical response in which the mechanical properties were independent of the applied load. Dogbone specimens with reinforcement oriented parallel to the applied load (strong axis) and perpendicular with the applied load (weak axis) were also tested. The specimens were fabricated with eight discrete regions about the center hole to eliminate the interfacial regions as a source of discrepancy between each group of specimens. Reinforcement orientation in the regions surrounding the defect resulted in significant changes in mechanical properties as well as failure behavior. In particular, the crack path in specimens with reinforcement perpendicular to the load failed with a cleaved interface, while less direct crack paths occurred in specimens with parallel or circumferential reinforcement.

Figure 27:
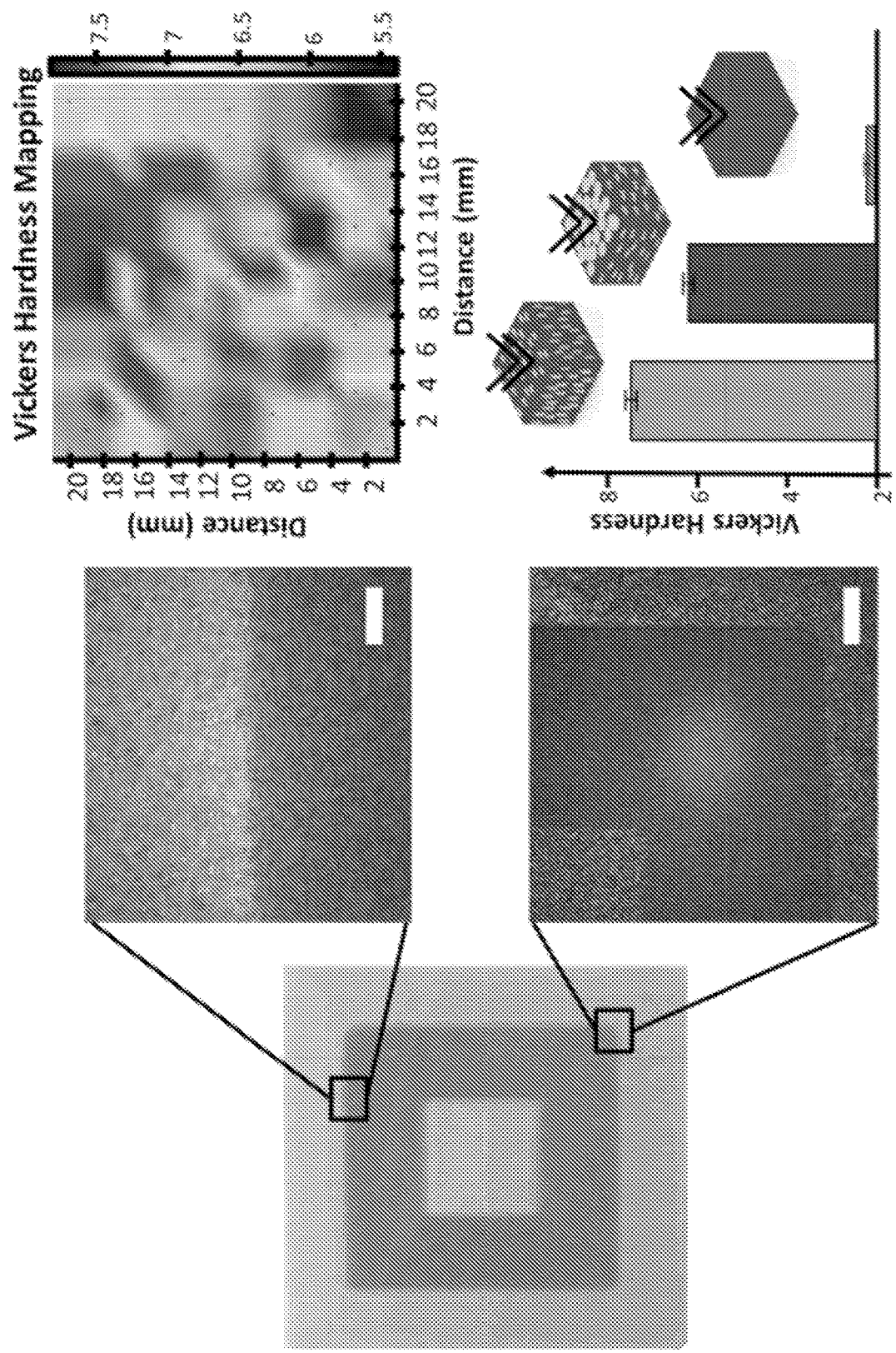
FIG. 27 illustrates hardness mapping of a specimen.

FIG. 27 illustrates hardness mapping of a specimen having a rectilinear pattern in which inner and outer areas have an in-plane orientation and a center band has an out-of-plane orientation. This specimen included 15% volume fraction alumina particles with a 22×22×3 mm (20 layers). Hardness mapping was conducted using Vickers micro-indentation with an applied force of 0.98 N, 15 second dwell time, and an indentation spacing of 1.5 mm, which is greater than 5 times the average diagonal length (approximately 200 microns). Sample thickness and test site spacing prevented indentations from affecting subsequent tests. The collected data points (77 total) across the sample can be viewed on the contour map. Surface plots were generated using MatLab with a 1.5 mm grid and nearest neighbor interpolation in order to accurately represent the specimen.

FIGS. 28A-D illustrate the ability to manipulate fracture behavior using simple, homogenous specimens with patterned orientations. In each specimen, a small crack was initiated, and the specimens were subsequently subjected to strain at 2 mm/minute. By changing the size and scale of the ordered regions, the crack path could be altered. In FIG. 28A, the specimen had small islands (darker squares) reinforced against crack propagation while the remaining areas (matrix phase) were oriented in-plane with no preferential direction or easy axis for crack propagation. The crack remained in the matrix phase and did not enter any of the reinforced regions. In a specimen in which the islands were oriented parallel to the crack direction (easy axis), the crack traveled into the darker area to minimize fracture energy (FIG. 28B). In the specimen in FIG. 28C, the islands were offset and slightly larger than in the specimen in FIG. 28A. In this case, crack propagation through a reinforced island required greater energy than propagation around the island, providing an obvious crack deflection. Where the reinforced regions were spaced too closely, however, as in the brick and mortar pattern in FIG. 28D, the crack path was not affected by the patterned orientations.

The method and composite materials and parts made with the method have application in a variety of industries. Composite materials and parts with enhanced mechanical properties including high strength to weight ratios can provide enhanced strength relative to comparable materials fabricated with injection molding composites where geometry and shear determine fiber alignment. Composite materials and parts can enable the production of strong, light devices for military applications, such as micro-aerial vehicles. Customized biomedical devices, implants, orthotics, and prosthetics that are patient-specific and designed to maximize material properties can be produced.

Composite materials and parts with enhanced thermal conductivity properties including anisotropic and programmed thermal conductivity can be provided, such as conductive or non-conductive fillers. Applications include aerospace components, embedded electronics, and the like.

Composite materials and parts with enhanced optical properties can be provided, such as composites that architectures with optically different fillers, or programmable optical filters.

The process and apparatus disclosed herein enable discontinuous fiber composites to be assembled with precise control over the orientation and spatial distribution of the reinforcing particles using magnetic fields during various additive manufacturing processes. This technology combines a non-invasive, low energy assembly technique using magnetic fields to target a wide variety of reinforcement fillers, whether or not they are inherently magnetic, and structure them during fabrication into virtually any complex geometry. The method and apparatus can be used to create materials with uniform, anisotropic (specific to one direction), or highly heterogeneous (specific throughout the material) mechanical, thermal, electrical and optical properties (e.g. tensile strength, thermal conductivity, electrical conductivity and opacity/color). The present method is highly programmable and reproducible. In contrast, current additive manufacturing techniques do not allow for printing of polymer-ceramic composites, let alone composites with control over the reinforcement architecture. Other methods of creating composites reinforced in three dimensions, such as fiber weaving or z-pinning, do not achieve the high spatial resolution over reinforcement orientation that is possible with this method and apparatus.

It will be appreciated that the various features of the embodiments described herein can be combined in a variety of ways. For example, a feature described in conjunction with one embodiment may be included in another embodiment even if not explicitly described in conjunction with that embodiment.

The present invention has been described in conjunction with certain preferred embodiments. It is to be understood that the invention is not limited to the exact details of construction, operation, exact materials or embodiments shown and described, and that various modifications, substitutions of equivalents, alterations to the compositions, and other changes to the embodiments disclosed herein will be apparent to one of skill in the art.

What is claimed is:

1. A method of producing a composite part, comprising:
   (a) introducing a precursor material in a first layer adjacent a build plate, the precursor material comprising a matrix material and magnetically responsive particles, the magnetically responsive particles comprising at least in part a magnetic material;
   (b) orienting the magnetically responsive particles in a first alignment with a first magnetic field;
   (c) consolidating a first portion of the matrix material in the first layer with the magnetically responsive particles within the first portion held in the first alignment in accordance with a particle alignment pattern for the first layer, by concurrently consolidating a first subset of discrete voxels;
   (d) orienting a further portion of the magnetically responsive particles in a further alignment different from the first alignment with a further magnetic field; and
   (e) consolidating a further portion of the matrix material in the first layer with the magnetically responsive particles within the further portion held in the further alignment in accordance with the particle alignment pattern for the first layer, by concurrently consolidating a further subset of discrete voxels.

2. The method of claim 1, further comprising:
(f) repeating steps (d) and (e) until a determined portion of the matrix material in the first layer has been consolidated.

3. The method of claim 1, wherein in steps (c) and (e), the matrix material is partially cured, fully cured, solidified, polymerized, or cross-linked.

4. The method of claim 1, further comprising, when a desired portion of the matrix material in the first layer has been consolidated, removing the first layer from the build plate and introducing additional precursor material adjacent the build plate in a second layer and adjacent to the first layer.

5. The method of claim 1 further comprising:
(g) introducing additional precursor material in a second layer adjacent the first layer,
(h) orienting the particles in the second layer in a third alignment with a magnetic field;
(i) consolidating a first portion of the matrix material in the second layer with the magnetically responsive particles within the first portion held in the third alignment;
(j) orienting a further portion of the magnetically responsive particles in a fourth alignment with a magnetic field different from the third alignment;
(k) consolidating a second portion of the matrix material in the second layer to consolidate the matrix material with the magnetically responsive particles within the second portion held in the fourth alignment;
(l) repeating steps (j) and (k) until a desired portion of the matrix material in the second layer has been consolidated.

6. The method of claim 1, wherein the first and further magnetic fields are applied by one or more magnetic field sources parallel to a plane of the first layer and one or more magnetic field sources out of plane with the first layer.

7. The method of claim 1, wherein the voxels of the first portion are interspaced with the voxels of the further portion.

8. The method of claim 1, wherein each voxel has a resolution of at least about 50 ×50 ×50 microns.

9. The method of claim 1, wherein each layer has a thickness of at least about 50 microns.

10. The method of claim 1, wherein the magnetic material comprises a ferromagnetic material, a paramagnetic material, a superparamagnetic material, iron oxide, iron, cobalt, nickel, an iron alloy, a cobalt alloy, or a nickel alloy.

11. The method of claim 1, wherein the magnetic material comprises particles, microbeads, nanoparticles, filings, fibers, flakes, rods, whiskers, or platelets.

12. The method of claim 1, wherein the magnetically responsive particles comprise a non-magnetic material coupled with the magnetic material.

13. The method of claim 12, wherein the non-magnetic material comprises aluminum oxide, calcium phosphate, copper, glass, calcium sulfate, nylon, polystyrene, or silicon carbide.

14. The method of claim 12, wherein the non-magnetic material comprises discontinuous fibers, rods, platelets, flakes, or whiskers.

15. The method of claim 12, wherein the non-magnetic material is coated with the magnetic material.

16. The method of claim 1, wherein the magnetically responsive particles are anisotropic in shape in at least one dimension.

17. The method of claim 1, wherein the magnetically responsive particles have a longest dimension ranging from 200 nm to 1000 μm.

18. The method of claim 17, wherein the magnetically responsive particles have a longest dimension ranging from 1 μm to 20 μm.

19. The method of claim 1, wherein the magnetically responsive particles have an aspect ratio ranging from 2 to 200.

20. The method of claim 1, wherein the matrix material comprises a photopolymer and in step (c) and step (e), the matrix material is cured by illumination of selected voxels of the matrix material with radiation having a wavelength selected to effect a curing of the photopolymer.

21. The method of claim 1, wherein the radiation source ranges from 300 nm to 900 nm in wavelength.

22. The method of claim 1, wherein the radiation source ranges from ultraviolet to infrared.

23. The method of claim 1, wherein the matrix material comprises a photocurable acrylic material, a polymethylmethacrylate (PMMA) material, or a polyurethane material.

24. The method of claim 1, wherein the matrix material of the precursor material has a viscosity prior to consolidation ranging from 0.7 mPa·s to 10 Pa·s.

25. The method of claim 1, wherein the precursor material comprises an acrylic based photopolymer and reinforcing aluminum oxide micro-platelet particles labeled with iron oxide nanoparticles.

26. The method of claim 1, wherein steps (c) and (e) further comprise projecting illumination from a digital light projector on the first subset of discrete voxels and the further subset of discrete voxels respectively.

* * * * *